(12) United States Patent
Attar

(10) Patent No.: US 11,089,190 B2
(45) Date of Patent: Aug. 10, 2021

(54) FORMING COMBINED IMAGE BY IMAGING SYSTEM WITH ROTATABLE REFLECTOR

(71) Applicant: Glass Imaging Inc., Los Altos, CA (US)

(72) Inventor: Ziv Attar, Los Altos, CA (US)

(73) Assignee: Glass Imaging Inc., Los Altos, CA (US)

( * ) Notice: Subject to any disclaimer, the term of this patent is extended or adjusted under 35 U.S.C. 154(b) by 0 days.

(21) Appl. No.: 17/121,315

(22) Filed: Dec. 14, 2020

(65) Prior Publication Data

US 2021/0185198 A1 Jun. 17, 2021

Related U.S. Application Data

(60) Provisional application No. 62/948,200, filed on Dec. 14, 2019, provisional application No. 62/959,884, filed on Jan. 11, 2020.

(51) Int. Cl.
*H04N 5/225* (2006.01)
*H04N 5/232* (2006.01)
*G02B 7/182* (2021.01)

(52) U.S. Cl.
CPC ..... *H04N 5/2254* (2013.01); *H04N 5/232933* (2018.08); *G02B 7/182* (2013.01)

(58) Field of Classification Search
CPC . H04N 5/2254; H04N 5/232933; G02B 7/182
USPC ................. 348/335; 359/726, 872
See application file for complete search history.

(56) References Cited

U.S. PATENT DOCUMENTS

| | | |
|---|---|---|
| 2009/0206161 A1 | 8/2009 | Olmstead |
| 2012/0057020 A1 | 3/2012 | Kobayashi et al. |
| 2013/0027577 A1 | 1/2013 | Holscher et al. |
| 2016/0241764 A1 | 8/2016 | Luo et al. |
| 2016/0255286 A1 | 9/2016 | Tsukada |
| 2017/0126937 A1 | 5/2017 | Evans et al. |
| 2017/0370702 A1 | 12/2017 | Wan et al. |

(Continued)

OTHER PUBLICATIONS

PCT International Search Report and Written Opinion, PCT Application No. PCT/US2020/064931, dated Mar. 11, 2021, 21 pages.

(Continued)

*Primary Examiner* — William Choi
(74) *Attorney, Agent, or Firm* — Fenwick & West LLP

(57) ABSTRACT

The following relates to forming a combined image by an imaging system with a rotatable reflector. A reflector is rotated about an axis to a first position relative to an image sensor. At the first position, the reflector directs light from a first portion of a view corresponding to an external environment towards the image sensor. An image of the first portion of the view is captured by the image sensor. The reflector is rotated about the axis to a second position relative to the image sensor. At the second position, the reflector directs light from a second portion of the view corresponding to the external environment towards the image sensor. An image of the second portion of the view is captured by the image sensor. The image of the first portion and the image of the second portion are combined to form an image corresponding to the view.

20 Claims, 30 Drawing Sheets

(56) References Cited

U.S. PATENT DOCUMENTS

2019/0265461 A1\* 8/2019 Xie .................. G02B 17/08
2020/0244854 A1 7/2020 Lee et al.

OTHER PUBLICATIONS

United States Office Action, U.S. Appl. No. 17/121,239, dated Mar. 12, 2021, 11 pages.

\* cited by examiner

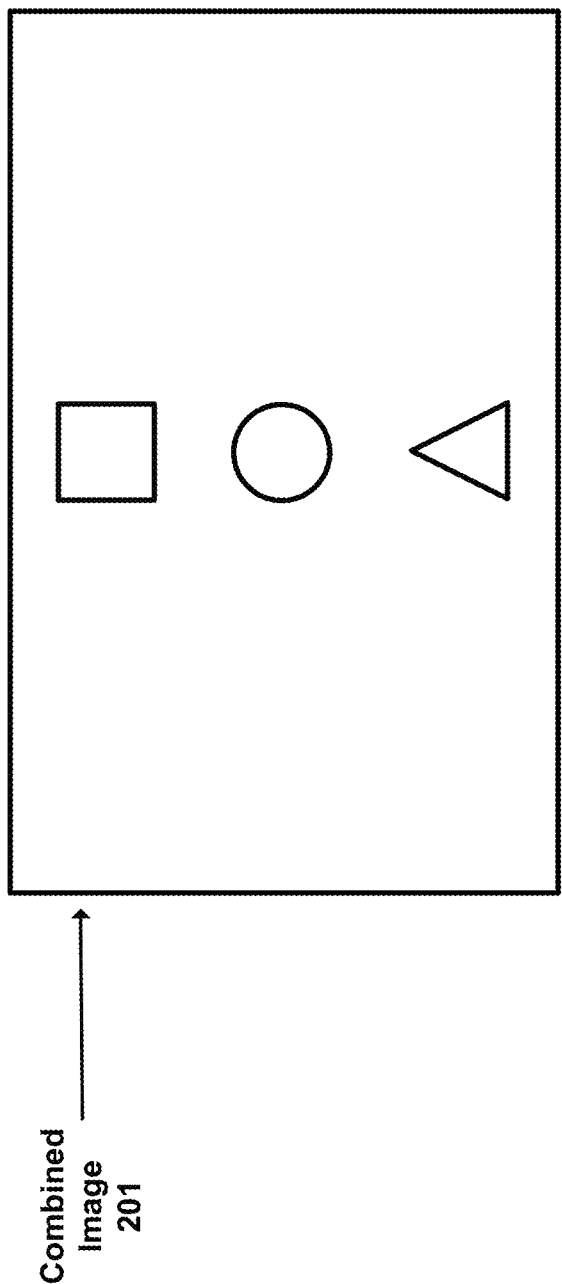

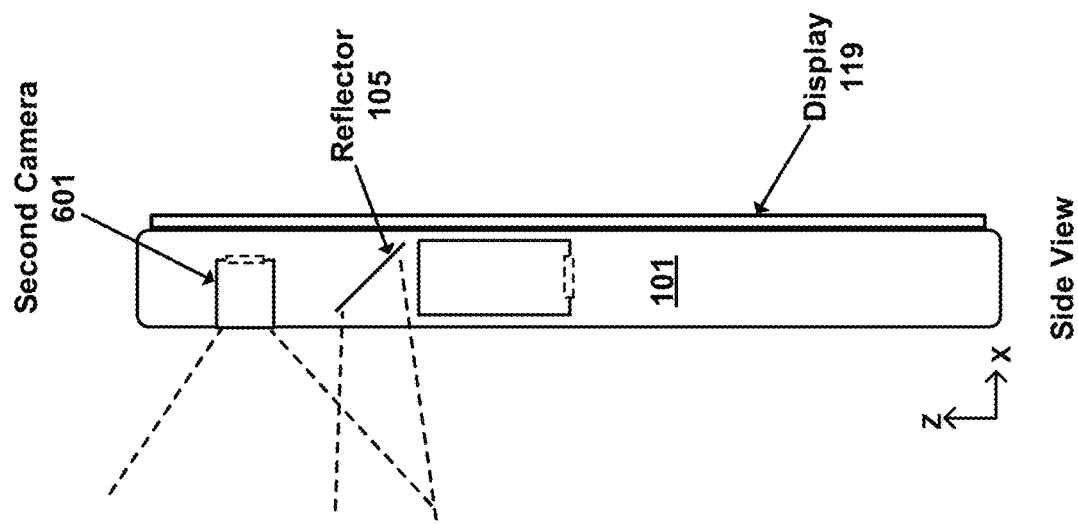
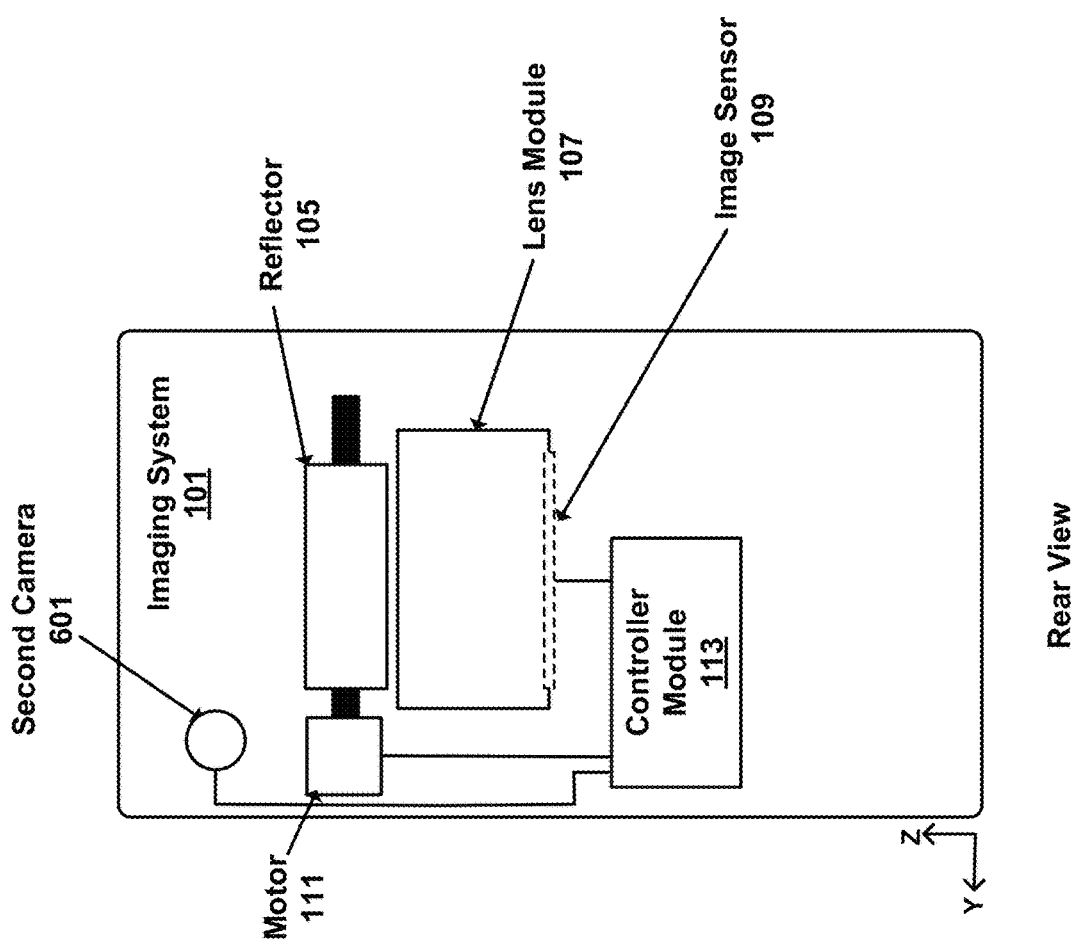
FIG. 6

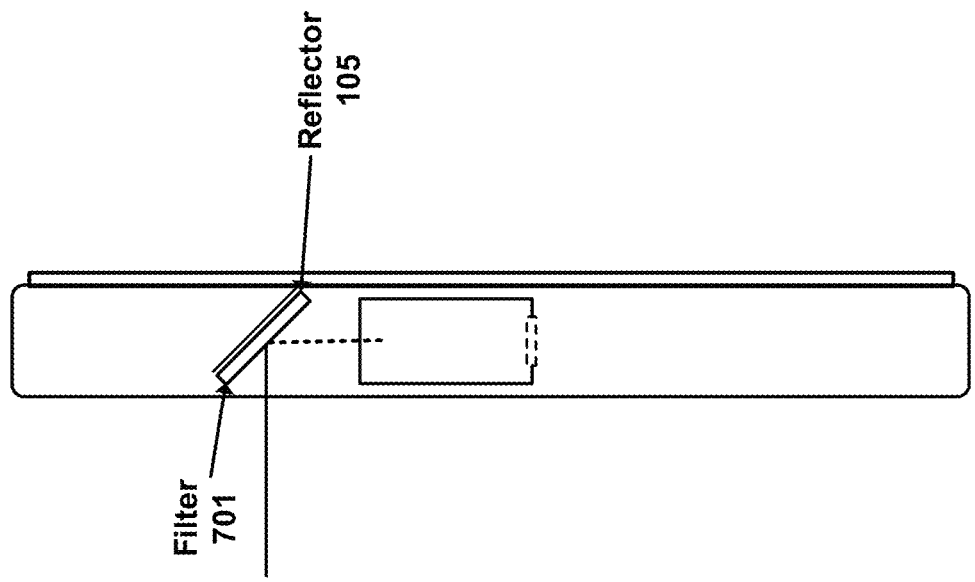
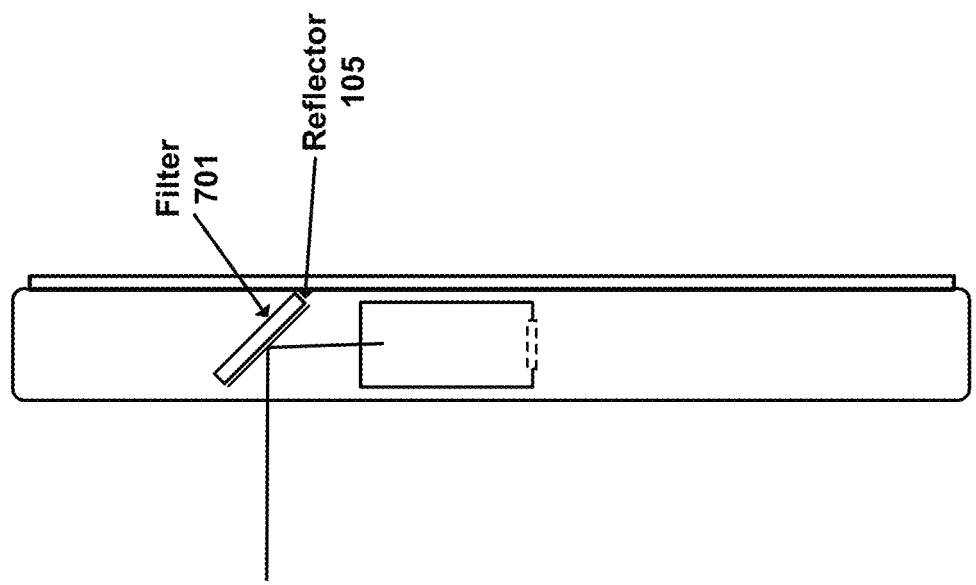
FIG. 7

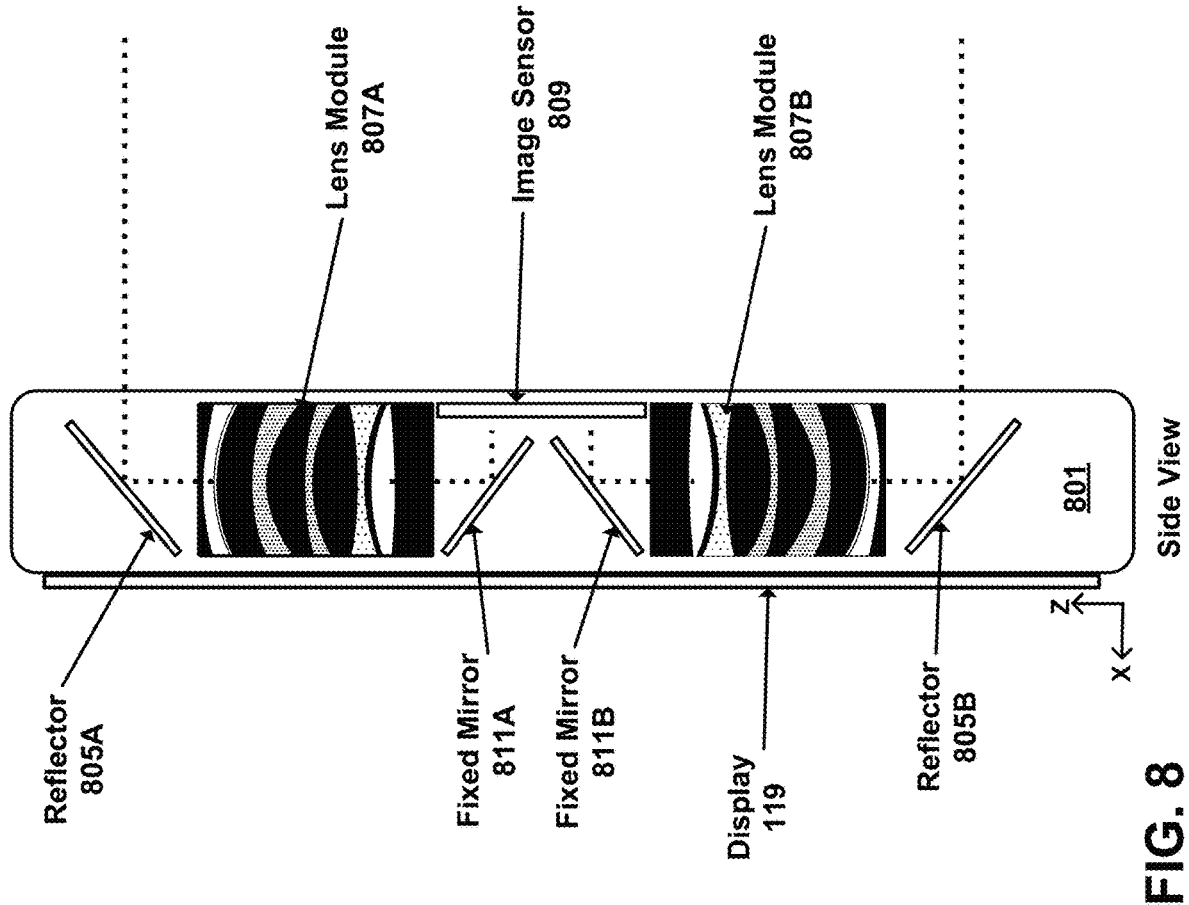
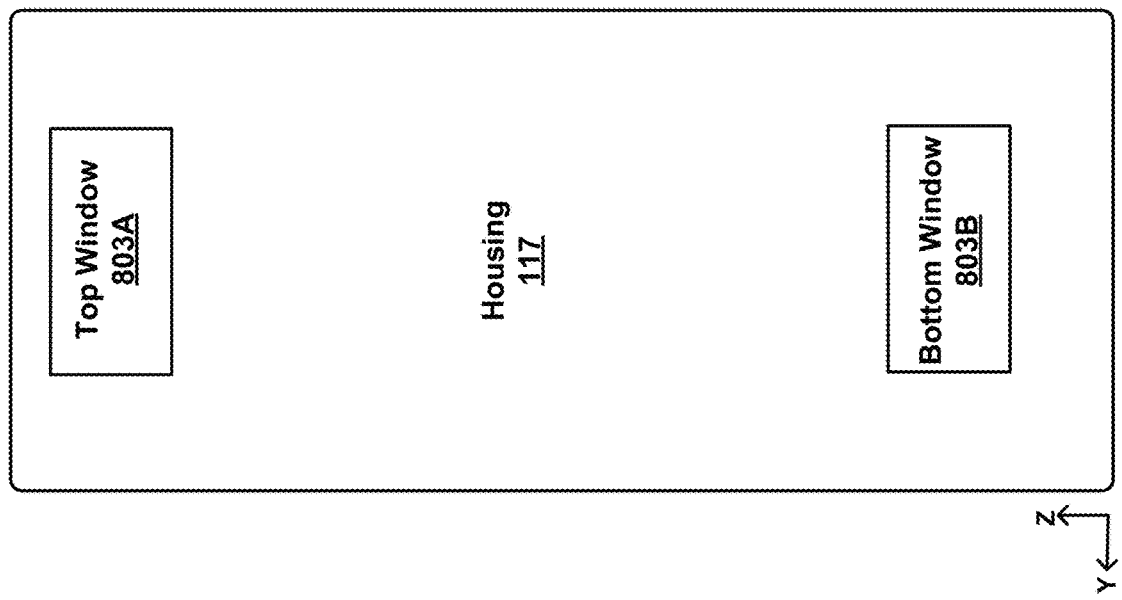
FIG. 8

FORMING COMBINED IMAGE BY IMAGING SYSTEM WITH ROTATABLE REFLECTOR

CROSS REFERENCE TO RELATED APPLICATION

This application claims the benefit of U.S. Provisional Application No. 62/948,200, "A New Architecture for an Imaging Device," filed on Dec. 14, 2019, and the benefit of U.S. Provisional Application No. 62/959,884, "A New Architecture for an Imaging Device," filed on Jan. 11, 2020. The subject matter of all of the foregoing is incorporated herein by reference in their entirety.

The present disclosure relates to U.S. patent application Ser. No. 17/121,239, entitled "Imaging System with Rotatable Reflector" and filed on Dec. 14, 2020, the content of which is incorporated by reference.

FIELD OF ART

The disclosure generally relates to the field of imaging systems and, in particular, to imaging systems with rotatable reflectors.

BACKGROUND

A photographic camera includes a housing, a light sensitive surface, and a lens that images a scene on to the light sensitive surface. In the past, the light sensitive surface was a film. In modern devices, such as mobile devices and photographic cameras (e.g., single-lens reflex (SLR) cameras, drone cameras, video cameras), the film has been replaced by an image sensor that can translate the amount of light in small areas called pixels into electrical signals. Common image sensor devices are charge-coupled device (CCD) sensors and complementary metal-oxide-semiconductor (CMOS) sensors.

The size of a camera generally depends on the image sensor size, the lens size, and the housing size. The larger the image sensor is, the larger the lens becomes. The size of the lens depends also on the focal length of the lens which dictates the field of view of the camera. The lens design may also contribute to the size of the lens.

After many years of evolution and technology advancements in image sensors, lens design, lens manufacturing, and mechanical housing technology, cameras have converged to some dimensions which vary between applications. For example, camera systems in mobile devices may be a few millimeters in all 3 dimensions. This size may come from the desire for mobile devices to be small enough to fit into small spaces such as trouser pockets or small purses. As a result, in some cases the largest image sensor that may be used in such devices is limited to a few millimeters by a few millimeters. In some cases, the image sensor may be further limited by the size of the lens that forms an image on the image sensor. To compensate for these limitations, modern mobile devices may have more than one camera and the various cameras may be used to capture different fields of view and allow the users to perform actions such as zoom in while maintaining good image quality.

As stated previously, the size of an image sensor in a mobile device is limited. This consequently limits the image sensor's ability to collect a large amount of light while taking pictures. In addition to sensor size, the amount of light that can be captured by a sensor may depend on the lens aperture and the exposure time. Over the years the lens aperture, also known as F/#, has decreased thanks to better manufacturing capabilities and assembly technologies, but for mobile devices the lens aperture has reached a limit of around F/1.8 approximately. This limits image quality considerations, for example, when a field of view is moving or shaking. Specifically, exposure time may be limited by a user's ability to hold the camera still and the motion of objects in the scene. Optical image stabilization (OIS) methods may help increase this exposure time. However, these OIS methods are not capable of affecting the "blue effect" which originates from the motion of objects in the scene.

As a result of the above constrains, exposure time limitations have reached the limit and stand around 50 milliseconds for a wide-angle lens. This can be extended to 200-300 milliseconds using OIS methods, but, as previously stated, OIS methods cannot avoid blur caused by moving objects in the scene. In some cases, mobile device uses a bracketing scheme which captures short and long exposures and reduces motion blur in the long exposures using information from short exposures.

Thus, these limitations on exposure time, lens aperture, and image sensor size limit the amount of light that a camera can capture and therefor limits the image quality the camera can deliver in terms of noise, resolution, dynamic range, colors, and more.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figures (FIGS. 1A and 1B illustrate an imaging system contained in a mobile device, according to an embodiment.

FIG. 2E illustrates an image of the view of the external environment formed from the images in FIG. 2D, according to an embodiment.

FIG. 6 illustrates the imaging system that includes a second camera, according to an embodiment.

FIG. 7 illustrates a two-sided reflector with a filter on one side, according to an embodiment.

FIG. 8 illustrates a dual lens imaging system 801, according to an embodiment.

DETAILED DESCRIPTION

Figure 1A:
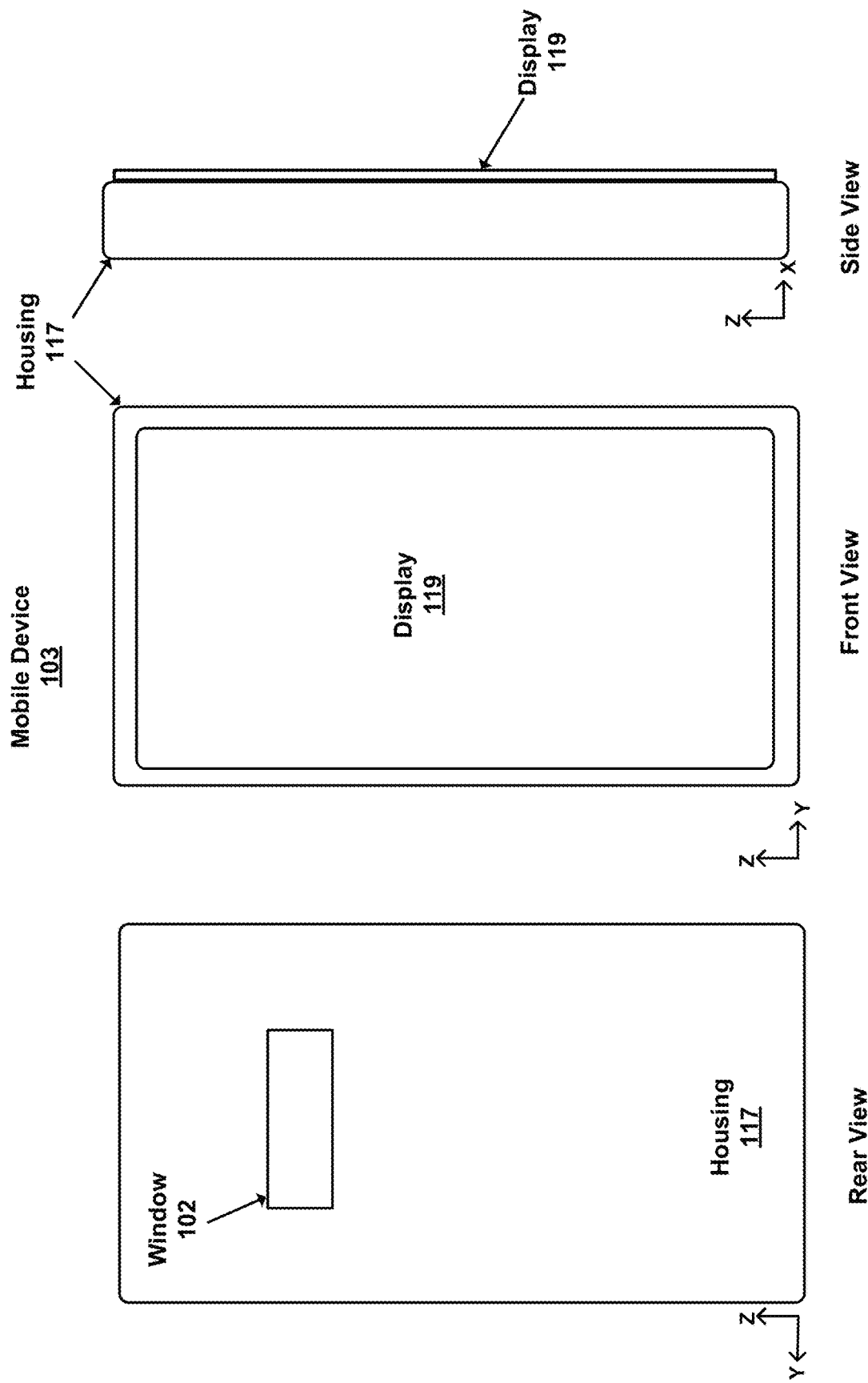

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Example embodiments relate to a new imaging system (also referred to as an image capture assembly) that increases the size of the image sensor significantly but keeps the dimensions of the imaging system small enough to fit in a mobile device. The imaging system may include an image sensor, a reflector, and a controller. The reflector may be rotatable relative to the image sensor about an axis. The reflector directs light from a portion of a view of an external environment towards the image sensor. The controller may be coupled to the image sensor and the reflector (e.g., via a motor). The controller rotates the reflector about the axis to direct light from different portions of the view towards the image sensor. The controller synchronizes the image sensor with the reflector to capture images of the different portions of the view. The controller combines the images from the image sensor to form an image that includes the view of the external environment.

Other example embodiments relate to an imaging system that includes an image sensor, a reflector, and an image processing circuitry. The reflector is positioned in proximity to the image sensor and is rotatable about an axis relative to the image sensor from a first position to a second position. At the first position, the reflector directs light from a first portion of an environment onto the image sensor. At the second position, the reflector directs light from a second portion of the environment onto the image sensor. The image processing circuitry is coupled with the image sensor. The circuitry combines a first image with a second image to form a composite image of the environment. The first image depicting the first portion of the environment captured with the reflector in the first position and the second image depicting the second portion of the environment captured with the reflector in the second position.

In some embodiments, the imaging system includes a housing that at least contains the image sensor and the reflector. The housing includes a window through which light from the environment propagates towards the reflector. A plane of the window may be substantially perpendicular to a sensor plane of the image sensor.

Imaging System

Figure 1B:
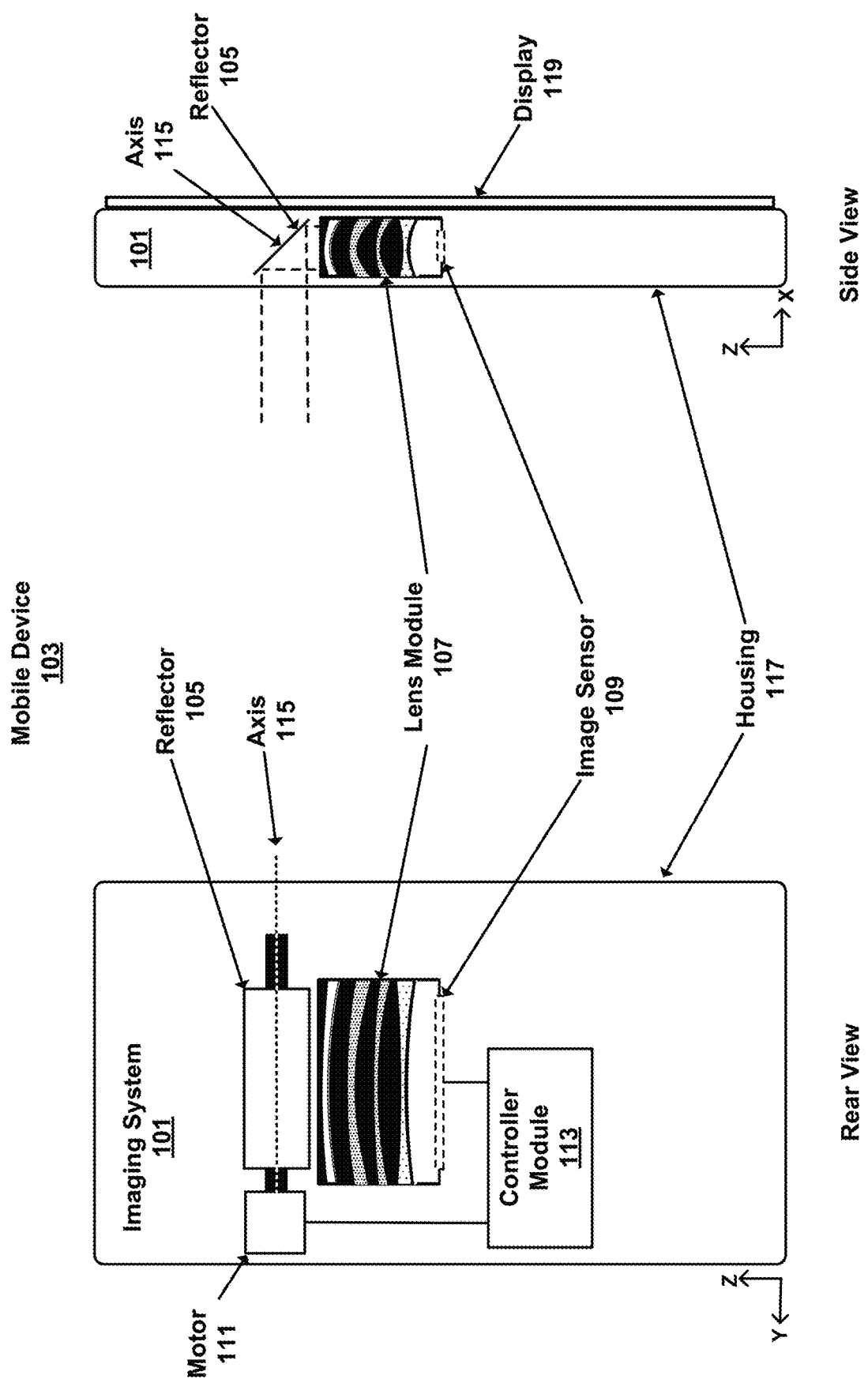

FIGS. 1A-1B illustrate an example imaging system 101 contained in an example mobile device 103, according to an embodiment. Specifically, FIG. 1A illustrates a front, rear, and side view of the mobile device 103, and FIG. 1B illustrates a cross-sectional rear view and cross-sectional side view of the mobile device 103. The mobile device 103 includes the imaging system 101, a housing 117 with a window 102, and a display 119. The imaging system 101 includes a rotatable reflector 105, a motor 111, a lens module 107, an image sensor 109, and a controller module 113.

The reflector 105 directs light passing through the window 102 downward towards the lens module 107. The lens module 107 focuses light onto the image sensor 109. The motor 111 rotates the reflector 105 about axis 115, which is substantially parallel (e.g., within a degree or two) to the image sensor plane. Rotating the reflector 105 allows the reflector 105 to direct light from different portions of the external environment towards the image sensor 109. The controller 113 is electrically coupled to the image sensor 109 and the motor 111. To form an image of the external environment, the imaging system 101 captures images of portions of a view of the external environment while rotating the reflector 105. The rotation of the reflector 105 from an initial angular position to a final angular position may be referred to as a scan. The sequence of captured images contains information of several adjacent portions of the environment and, after combining (e.g., stitching or fusing) the images together, the imaging system 101 forms a larger image of the external environment with a predetermined aspect ratio.

The housing 117 contains one or more of the components of the imaging system 101. Locations and orientations of the imaging system components may be described relative to the housing 117 and a housing window 102. For example, the housing 117 is defined by multiple walls that contain the imaging system 101, and one of the walls includes a housing window 102 with a plane, for example, defined by a boundary of the window 102. The plane may be parallel to a y-z (or yz-) plane in a three-dimensional reference system. The housing 117 may have a low profile along an axis perpendicular to the plane of the window 102 (e.g., along the x-axis). The length of the housing along the x-axis may be referred to as the thickness of the housing 117 and may range from, for example, 5 to 15 millimeters. In embodiments where the housing 117 is part of a mobile device 103, the window plane may be parallel to a display 119 of the mobile device 103. Unlike conventional imaging systems, the image sensor surface does not face the window plane. For example, the image sensor surface is perpendicular to the window plane (e.g., parallel to the xy-plane) and is outside the boundary of the window 102. Due to this, the reflector 105 may be aligned with the window 102 to direct light propagating through the window 102 to the image sensor plane. The lens module 107 may be between the reflector 105 and the image sensor 109. An aperture plane may be between the reflector 105 and the lens module 107 and may be perpendicular to the window plane and parallel to the image sensor plane. The reflector allows the optical path of the imaging system 101 to be folded into the yz-plane. This folding allows the optical path to increase beyond the limit of the housing's thickness and into the housing's width (e.g., length along the y-axis) and height (e.g., length along the z-axis), which are typically larger than its thickness. Thus, the reflector, the image sensor, and/or an aperture of the lens module 107 may have aspect ratios that are not 1:1, and their long axes may be parallel to each other.

The terms "parallel" and "perpendicular" as used herein may refer to components being substantially parallel or substantially perpendicular (e.g., within one or two degrees) since manufacturing components that are perfectly parallel or perpendicular may be practically difficult to achieve.

The image sensor 109 is an imaging device that captures images of portions of the external environment. Examples of the image sensor 109 include a CCD sensor and a CMOS sensor. As illustrated in FIG. 1, the image sensor surface may lie in the xy-plane relative to an xy-plane of the mobile device 103 and the image sensor surface faces in a perpendicular direction (along the z-axis) from the xy-planar surface. Due to this positioning, the sensor plane of the image sensor 109 does not face the view of the external environment. By placing the image sensor 109 in the xy-plane, the size of the image sensor 109 can be larger than image sensors in conventional cameras. The smaller dimension of the image sensor plane (along the x-axis) may be limited by the mobile device thickness while the longer dimension (along the y-axis) may be limited by the mobile device width, which may be many centimeters long. This allows the image sensor 109 to have a high aspect ratio, such as ratio greater than 17:9 (e.g., 1:10). Conventional cameras produce image of scenes with aspects ratios that are not as high (e.g., sensors that are limited to 2:3, 3:4, or 16:9). Due to the high aspect ratio of the image sensor 109, the image sensor 109 may create narrow images ("image strips") that correspond to a narrow view of the scene. For conventional imaging systems in mobile devices, the size of the image sensor may be limited by the focal length of the camera lens. However, by changing the location and orientation of the image sensor 109 as described herein, the image sensor size may be larger than image sensors in conventional imaging systems with a same or similar housing.

As described above, the reflector 105 (also referred to as a scanning mirror) is an optical component that rotates about axis 115 to direct light to the image sensor 109. Generally, axis 115 is substantially parallel to a long dimension of the image sensor plane and the reflector 105 is centered on window 102. If the plane of the window 102 (e.g., the yz-plane) is perpendicular to the plane of the image sensor 109 (e.g., the xy-plane), the reflector 105 may direct light at around a 45-degree position relative to the image sensor plane to direct light towards the image sensor 109. Due to the high aspect ratio of the image sensor 109, the reflector 105 may also have a high aspect ratio to ensure light is reflected to the entire surface of the image sensor 109. The reflector 105 is illustrated in FIG. 1B as having a rectangular plane, however other shapes are possible, such as concave or convex shapes (e.g., which may be used to expand or shrink the field of view).

The reflector 105 is described herein in terms of 'directing' light, however this is for ease of description. The reflector 105 may optically direct, widen, slim, reflect, diffract, refract, disperse, amplify, reduce, combine, separate, polarize, or otherwise change properties of the light as it propagates in the imaging system 101. To do this, the reflector 105 may include reflective coatings, metalized features, optical gratings, mirrors, prismatic structures, Fresnel structures, corner reflectors, retroreflectors, and the like on one or more of its surfaces.

The lens module 107 includes one or more optical components and is designed to form an image on the image sensor 109. The lens module 107 may spread, focus, redirect, and otherwise modify the light passing through it. The lens module 107 may be as simple as a single lens or it may include additional optical components, such as diffusers, phase screens, beam expanders, mirrors, and lenses (e.g., anamorphic lenses). In some embodiments, the entrance pupil of the lens module 107 is adjacent to the reflector 105. This may allow the reflector 105 to have a smaller size.

Because of the high aspect ratio of the image sensor 109, the lens module 107 may be designed and manufactured to be non-circular and/or asymmetric and follow the dimension of the image sensor 109 in the terms of its aperture. Using a lens module 107 with an asymmetrical aperture may allow it to fit in the mobile device housing 117. Furthermore, the focal length of the lens module 107 may be different in the x and y directions. In some embodiments, this results in the imaging system 101 not preserving the aspect ratio, so, for example, a 4:3 scene may be imaged by an image sensor that is 8:3. One or more of the optical components of the lens module 107 may have surfaces with cylindrical symmetry but the apertures of other components may be rectangular or another elongated shape. The lens module 107 may be manufactured using wafer level technology, which may be beneficial in creating rectangular shaped optical components by dicing lens surfaces in the desired aspect ratio. In some embodiments, the lens module 107 is manufactured using injection molding technology by creating molds that have asymmetrical apertures. The components of the lens module 107 may be glass or plastic injection molded or machined (e.g., via wafer level technology).

As stated above, the motor 111 rotates the reflector 105 around axis 115. To do this, the motor 111 may include one or more actuator type mechanisms, galvanometer type mechanisms, mems type mechanisms, motorized type mechanisms, or stepper motor type mechanisms. In some embodiments, as further described below, the motor 111 can move the reflector 105 in other directions. For example, the motor 111 can translationally and/or rotationally move the reflector 105 along the x, y, and/or z-axes.

In some embodiments, motor 111 tilts the reflector 105 (e.g., by a few degrees in either direction) to compensate for motion (e.g., hand motion) while the image sensor 109 is capturing an image of a portion of the scene. For example, if a user tilts the mobile device 103 slightly downward, the motor may tilt the reflector 105 upward to compensate for the motion so that the image sensor 109 receives a same portion of the scene despite the tilting. In some embodiments, the imaging system 101 includes a sensor shift mechanism (e.g., another motor) to shift the image sensor 109 in one or more directions (e.g., in the xy-plane) to compensate for this motion. In some embodiments, the imaging system 101 includes a lens shift mechanism (e.g., another motor) to shift the lens module 107 (or a component of it) in one or more directions (e.g., in the xy-plane) to compensate for this motion. If the imaging system 101 includes multiple motion compensating mechanisms, the controller 113 may coordinate the multiple mechanisms to work in conjunction to offset motion. For example, the motor 111 tilts the reflector 105 to compensate for motion in one direction and a sensor shift mechanism or a lens shift mechanism compensates for motion in another direction. In some embodiments, the reflector 105 rotates about multiple substantially perpendicular axes (e.g., the x-axis and z-axis) to compensate for motion (e.g., instead of a sensor or lens shift mechanism).

The motor 111 and shift mechanisms may also act as auto focusing mechanisms. For example, a lens shift mechanism shifts the lens module 107 (or a component of it) closer to or farther away from the image sensor 109 (e.g., along the z-axis) to achieve the desired focus. In another example, a sensor shift mechanism shifts the image sensor 109 closer to or farther away from the lens module 107 (e.g., along the z-axis) to achieve the desired focus.

The controller module 113 may constitute software (e.g., code embodied on a machine-readable medium or in a transmission signal) and/or hardware to provide control signals to the motor 111 and image sensor 109. Thus, the controller 113 rotates the reflector 105 to direct light from different portions of the external environment towards the image sensor 109 and synchronizes the image sensor 109 with the reflector 105 to capture images of the different portions of the environment. Additionally, the controller 113 may receive the captured images and combine them to form a lager continuous image of the external environment.

In some embodiments, the imaging system 101 includes one or more motion sensors (e.g. accelerometers, gyroscopes, etc.) to track motion of the imaging system relative to the external environment. The controller module 113 may receive motion data from the motion sensors. If the determined motion is above a threshold amount, the module 113 may provide instructions to the motor 111 and/or a sensor shift mechanism to compensate for the motion.

In some embodiments, the imaging system 101 is not contained in the mobile device 103. For example, the imaging system 101 is contained in a standalone device, such as a case for the mobile phone 103.

Figure 2A:
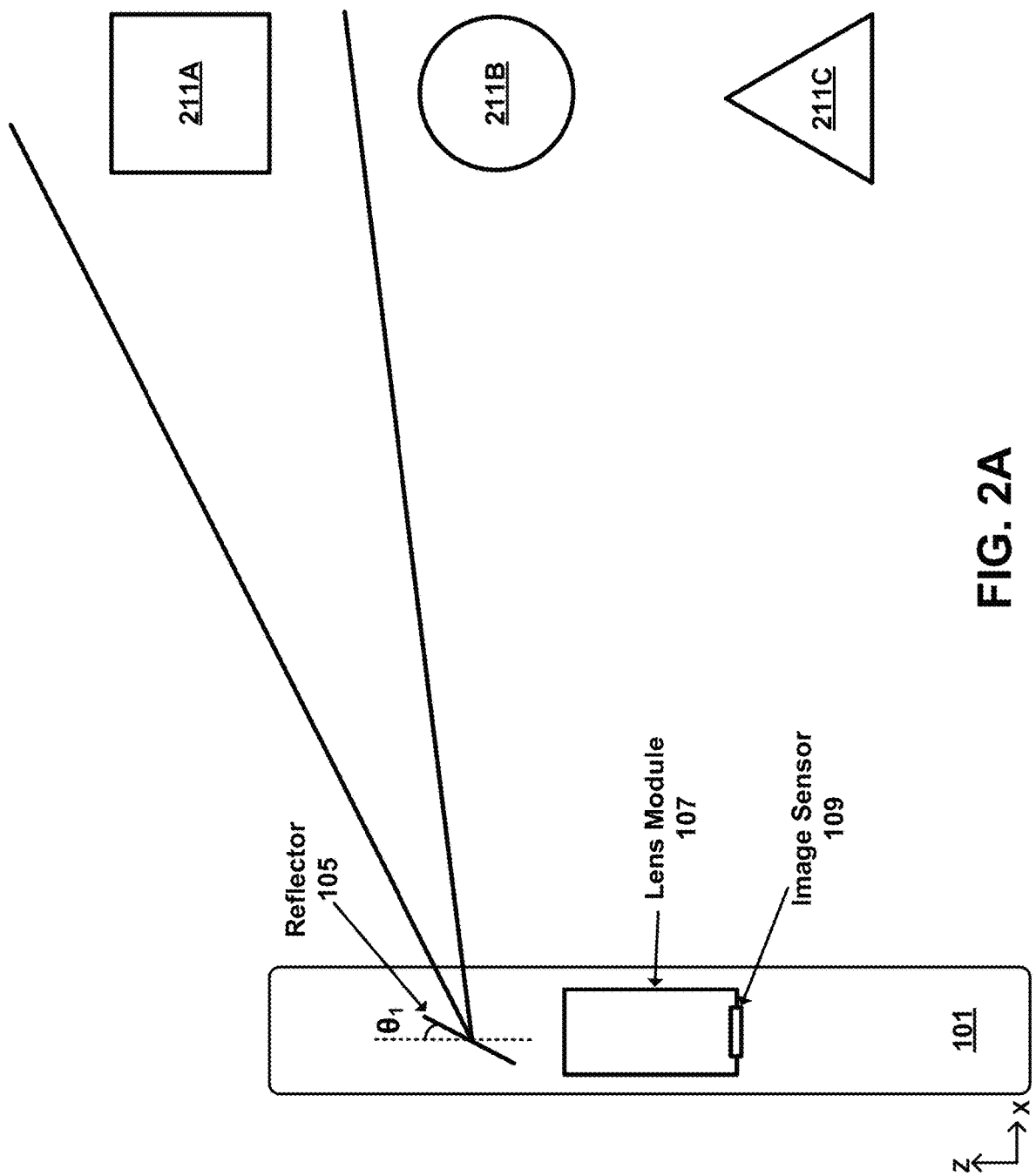
FIGS. 2A-2C illustrate the imaging system capturing images of different portions of a view of an external environment, according to an embodiment.
Figure 2B:
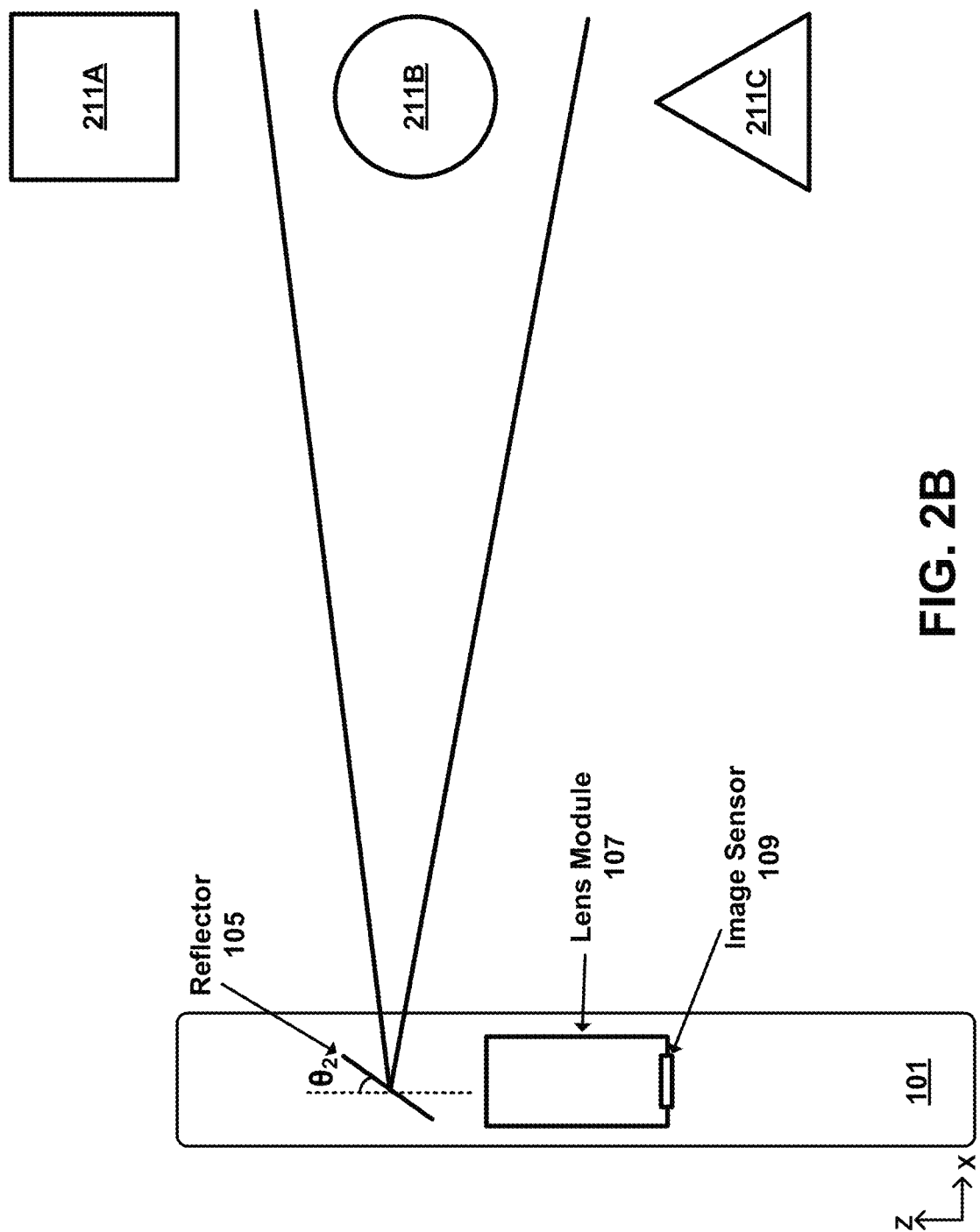
Figure 2C:
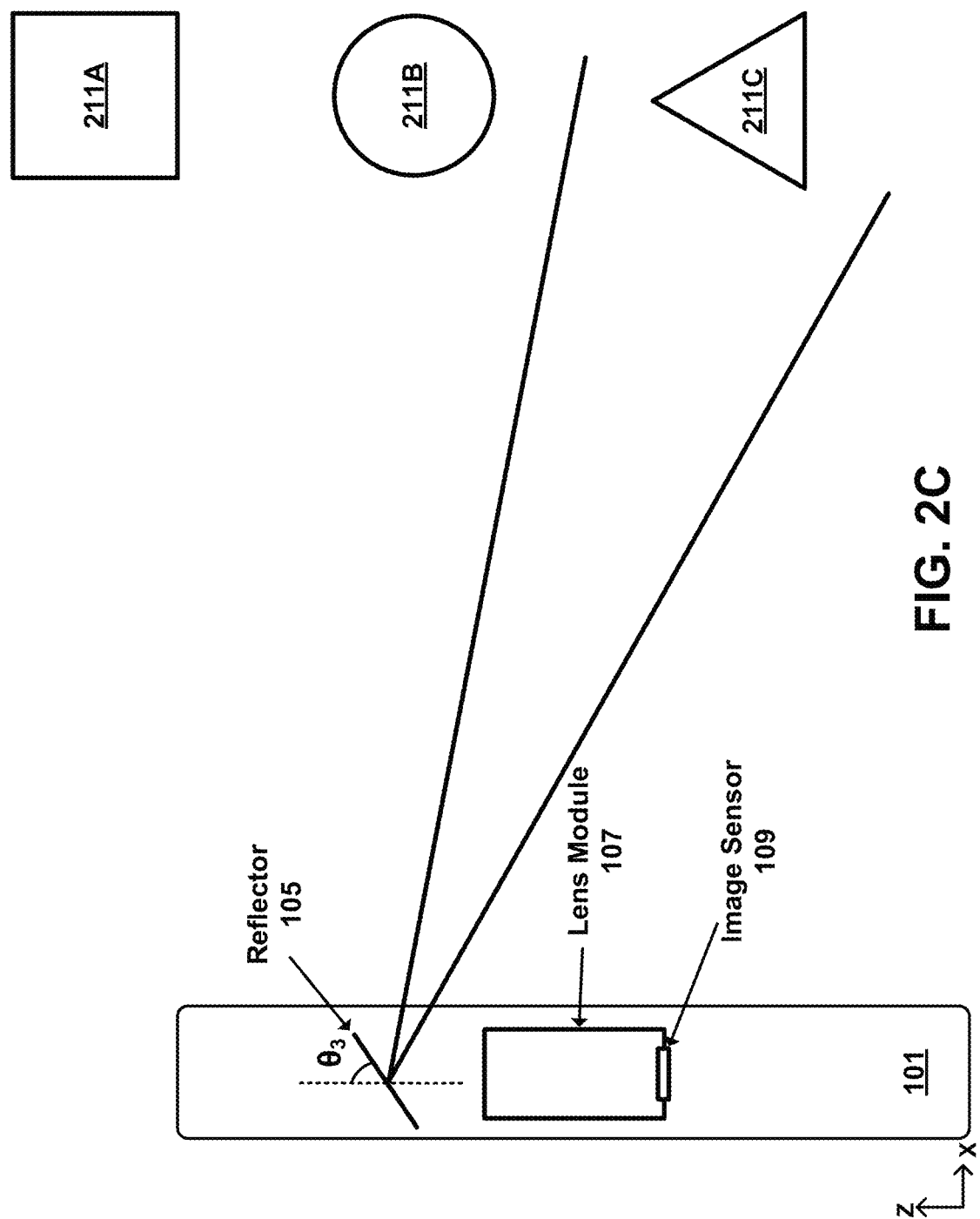

FIGS. 2A-2C illustrate the imaging system 101 capturing images of different portions of a view of an external environment, according to an embodiment. In the example of FIGS. 2A-2C, the external environment includes one or more objects within a field of view. In this example, for ease of discussion, the objects are a cube 211A, a sphere 211B, and a pyramid 211C that are vertically aligned. In FIG. 2A, the reflector 105 is tilted at a first rotational position (e.g., it forms angle θ1 relative to the yz-plane) to direct light from the top portion of the external environment towards the image sensor 109. Thus, the image sensor 109 captures an image of the cube 211A. In FIG. 2B, the reflector is tilted at a second rotational position (e.g., it forms angle $\theta_2 > \theta_1$ relative to the yz-plane) to direct light from the middle portion of the external environment toward the image sensor 109. Thus, the image sensor 109 captures an image of the sphere 211B. In FIG. 2C, the reflector is tilted at a third rotational position (e.g., it forms angle $\theta_3 > \theta_2$ relative to the yz-plane) to direct light from the bottom portion of the external environment toward the image sensor 109. Thus, the image sensor 109 captures an image of the pyramid 211C. In some example embodiments, to capture a set of images, the reflector angles θ may range symmetrically around the 45 degree position (e.g., from 25-65 degrees) relative to the xy-plane.

Figure 2D:
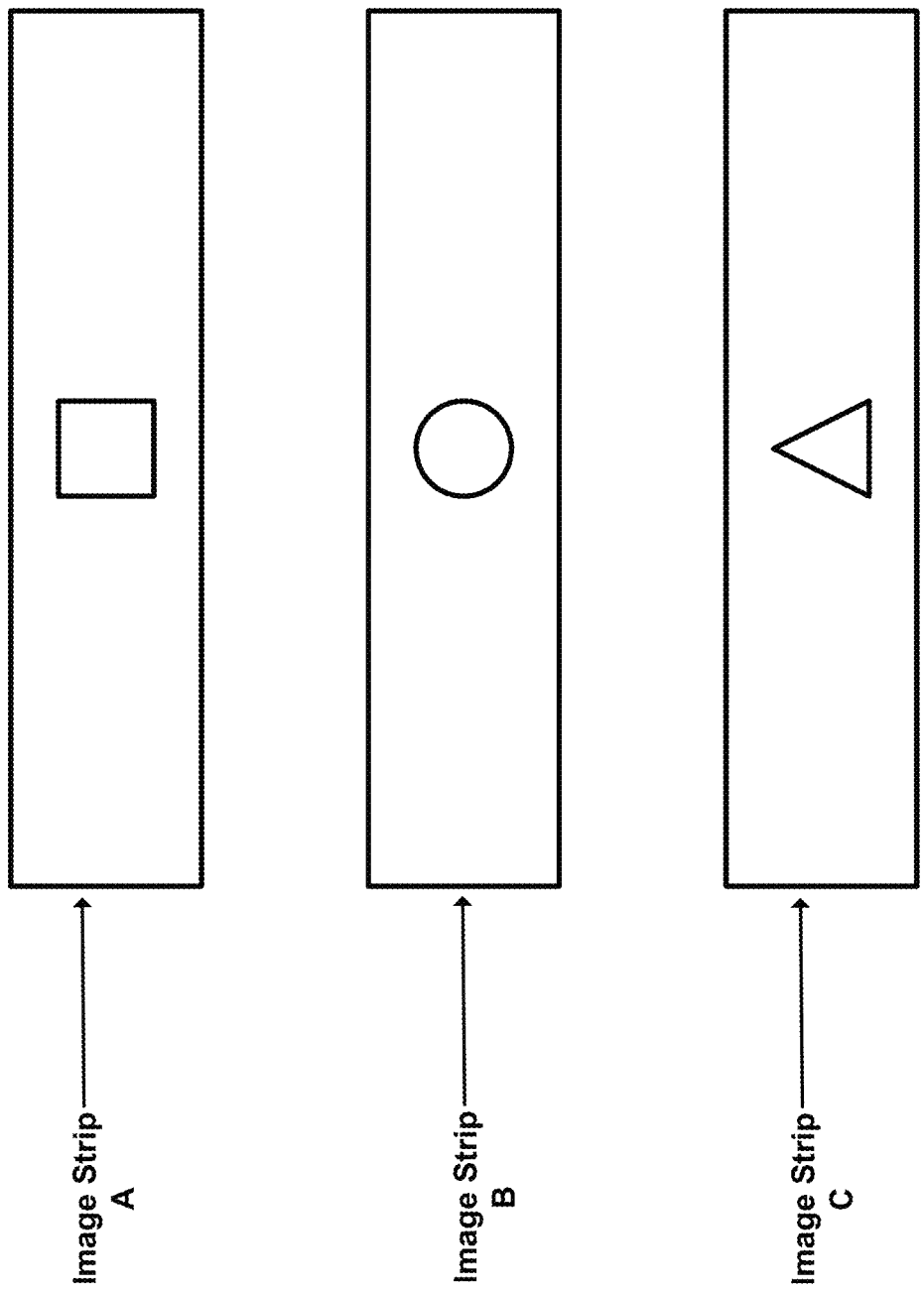
FIG. 2D illustrates the images of the portions of the view, according to an embodiment.

FIG. 2D illustrates three image strips that were captured by the image sensor 109, according to an embodiment. Each image strip is an image of a different portion of the external environment due to each strip being captured while the reflector 105 was in a different rotational position. The image strips have high aspect ratios due to the high aspect ratio of the reflector 105, lens module 107, and image sensor 109. Image strip A is an image of the cube 211A and was captured by the image system 101 in FIG. 2A. Image strip B is an image of the sphere 211B and was captured by the image system 101 in FIG. 2B. Image strip C is an image of the pyramid 211C and was captured by the image system 101 in FIG. 2C.

The exposure time to capture each image strip may be limited by user motion (the user unintentionally moving the device 103 as they hold it) and by objects moving in the scene. Additionally, the total exposure time of the image strips may be limited by possible changes in the external environment between the capturing of image strips. The image strip exposure times and the total exposure time may be limited to predetermined threshold times or determined dynamically (e.g., based on an amount of movement of the mobile device 103).

FIG. 2E illustrates an image 201 of a view of the external environment, according to an embodiment. The image 201 is formed by combining (e.g., fusing or stitching) image strips A-C illustrated in FIG. 2D. The combined image 201 may be referred to as a composite image. The horizontal field of view of the combined image 201 may be based on the width (along the y-axis) of the window 102, reflector 105, lens module 107 (e.g., its aperture), and/or image sensor 109, and the vertical field of view of the combined image 201 may be based on the scanning range of the reflector 105. Typically, the vertical field of view is larger than the horizontal field of view.

Depending on the position of the reflector 105 when image strips are captured, the image strips may have some overlap with each other (e.g., 10-300 rows of pixels). Capturing image strips with overlap may help ensure that the image strips are not missing portions of a view of the environment (e.g., so that the entire view is captured) and may reduce the noise value of the combined image 201. Capturing image strips with overlap may also assist the combination process to ensure the image strips are combined properly. For example, the controller 113 uses overlapping portions to align the image strips during the combination process. In another example, if objects in the environment move between the capturing of image strips or if the mobile device 103 moves between the capturing of image strips, the control system 101 may use the overlapping portions to correct for artifacts caused by this movement.

Rotating the Reflector

The rotation of the reflector 105 may be discrete such that it rotates from an initial (e.g., maximal) angular position of the reflector 105 to the final (e.g., minimal) angular position with N stops, where N is the number of image strips which will form a combined image. N may be as small as two. N may depend on the desired exposure time of the combined image and/or the size of the smaller dimension of the image sensor 109 and the desired size or aspect ratio of the combined image. For example, if the image sensor has 24,000 pixels by 6,000 pixels and if the final combined image is to have a 4:3 aspect ratio, then the reflector 105 will have three discrete positions and the combined image will be 24,000 pixels by 18,000 pixels. The previous scanning example did not include any overlap in the image strips. If N is increased, then some areas in the scene will appear more than once in the image strips. For example, if the scanning is done using six discrete angular positions then each point in the scene will appear in two image strips.

The imaging system 101 may be capable of capturing videos. In these cases, combined images may form frames of the video. If the video frame rate or preview frame rate is, for example, 25 FPS (frames per second) the total exposure time for each combined image is 40 milliseconds or less. In the case of a three discrete position scanning, each position may be exposed for 13.33 milliseconds. However, the reflector 105 needs time to change its position and to come to a stop, which means the exposure time may be around 10 milliseconds for each image strip.

For still image capture it is possible to interrupt an image preview displayed to the user when the user presses the capture button and allow longer exposure than the one limited by the image preview speed.

The above considerations considered a full field of view. If the imaging system 101 captures a narrower field of view, it may reduce the scanning range of the reflector 105. For example, if a user zooms in by a factor of three (i.e., 3× zoom), the imaging system 101 may not perform any scanning. Accordingly, the reflector 105 may be stationary. For example, if the image sensor 109 has 24,000 pixels by 6,000 pixels and the final image has a height of 6,000 pixels and an aspect ratio of 4:3, the reflector 105 may not rotate and the other dimension of the image may be 8,000 pixels (e.g., read out and cropped from the 24,000 pixel dimension of the image sensor 109).

In some embodiments, the rotation of the reflector 105 is continuous instead of discrete. In a continuous scanning mode, the reflector 105 continuously rotates at a speed that is slow enough that the captured images are not blurry, yet fast enough to finish scanning a desired field of view at desired frame rate (e.g., 40 milliseconds). In a continuous mode, the rotation rate of the reflector 105 may be dictated by a desired frame rate. For example, if a frame rate is 30 FPS (33 milliseconds between frames), the scene scanning takes around 25 milliseconds and then the reflector 105 is rotated back to its initial position. Other example values are possible, such as 30 milliseconds, depending on the how fast the reflector can be rotated back to its initial position. In embodiments where the reflector 105 is two sided, the reflector 105 my not need to be rotated back to its initial position.

In a continuous scanning mode, points in the external environment may appear on every line of pixels during a scan. The image sensor 109 may capture enough images so that a point is captured by each row of pixels for consecutive image strips. For example, if the image sensor 109 includes 6000 rows of pixels, it may capture 6000 images during a single scan. To do this, for example, an image sensor may, instead of integrating charge on one pixel for a certain number of milliseconds, integrate charge from changing pixels. If this change (scan) is synchronized with the reflector rotational speed, then the output can correspond to one point in space. An example implementation of this with an image sensor 109 is reading out just one pixel row, which can happen very quickly. So, for example, a sensor that does 30 FPS (frames per second) and has 6000 rows can perform 15000 FPS with reading out just one row. Alternative to capturing enough images so that a point is captured by each row of pixels, the image sensor 109 may capture a predetermined number of images during a scan that is less than the number of pixel rows.

Front and Back-Facing Modes

Figure 3:
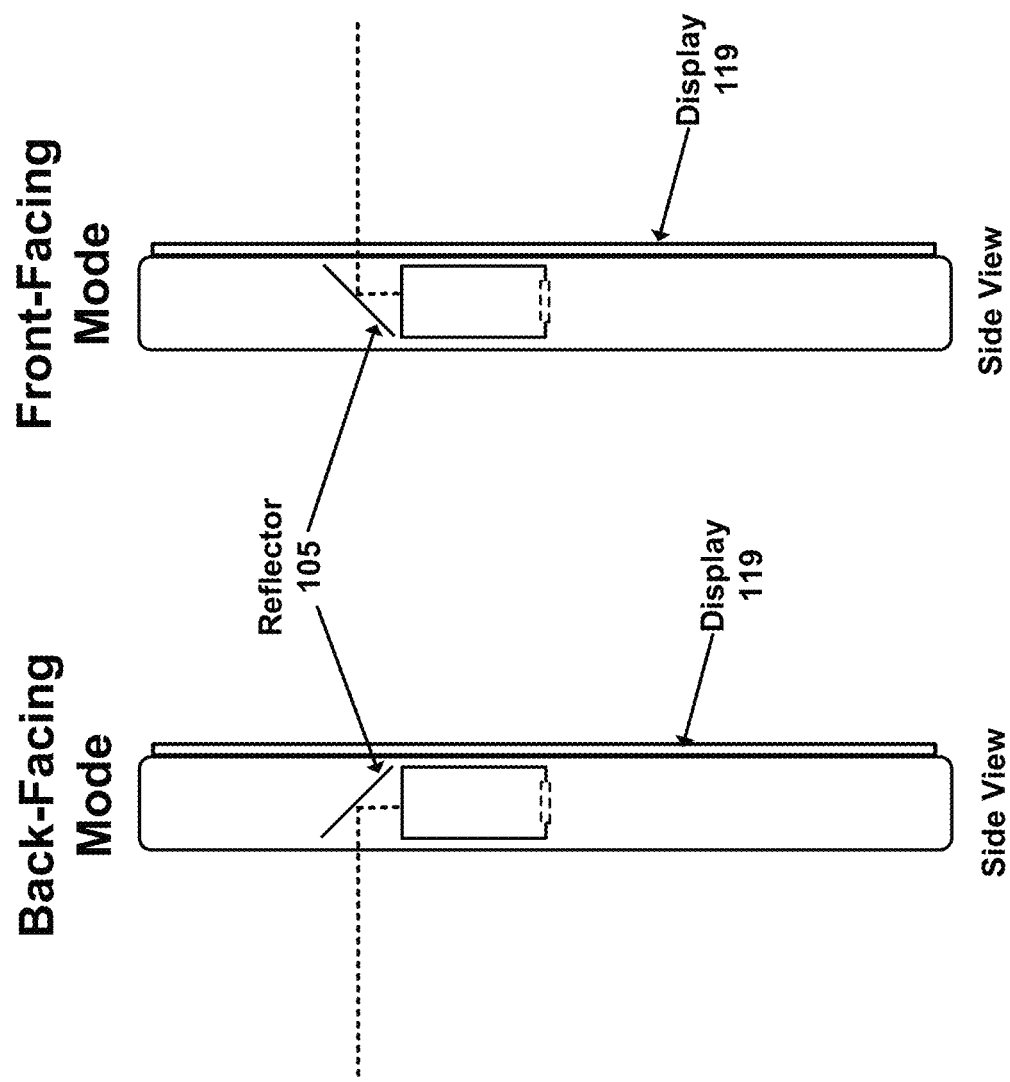
FIG. 3 illustrates the imaging system capturing an image of the environment in front of the housing and an image of the environment behind the housing, according to an embodiment.

In some embodiments, the imaging system 101 captures images of the external environment in front and back of the housing 117 by rotating the reflector 105. FIG. 3 illustrates the imaging system 101 capturing an image of the environment in front of the housing 117 (during a front-facing mode) and an image of the environment behind the housing 117 (during a back-facing mode), according to an embodiment.

The back-facing mode is described above with reference to FIGS. 1A and 1B. In the front-facing mode, the rotatable reflector 105 directs light passing through the display 119 to the image sensor 109. By directing light passing through the display 119, a notch or dedicated area for a window on the front of the mobile device 103 may be reduced or eliminated. Thus, the size of the display 119 may be increased, for example by extending the display 119 to the edges of the front face of the mobile device 103.

While some imaging systems can capture light passing through a display, they suffer from poor imaging performance due to display elements, such as light emitting diodes (LEDs) and wirings, diffracting and scattering light passing through the display. However, the image system 101 described herein can capture more light passing through the display due to a larger window (not illustrated in FIG. 3) and a larger lens aperture. Thus, the imaging system 101 has improved performance for imaging scenes in front of the mobile device.

Non-Uniformity Correction (NUC) Mode

Figure 4:
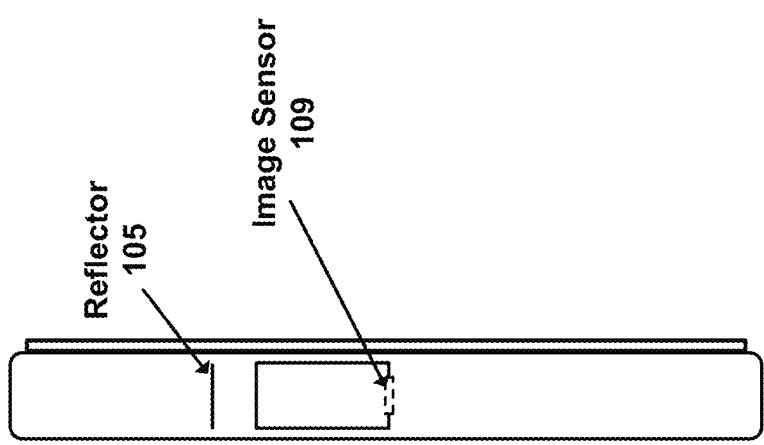
FIG. 4 illustrates the reflector positioned to block light from the external environment from propagating towards an image sensor of the imaging system, according to an embodiment.

FIG. 4 illustrates the reflector 105 positioned to block light from the external environment from propagating towards the image sensor 109 (during a non-uniformity correction (NUC) mode), according to an embodiment. Specifically, the reflector 105 is oriented to face the image sensor 109 (e.g., be parallel to the image sensor plane). The NUC mode may be used to protect pixels of the image sensor 109 (e.g., if mobile device is exposed to wavelengths that can damage the pixels). For example, if the mobile device 103 is on a table on a sunny day, the sun may be imaged by the sensor and the sensor may be damages due to this. Being able to block the sun's radiation by rotating the reflector can prevent damage to the sensor 109 and its optical coatings (e.g., filters). The NUC may also be used to zero or tare the pixels of the image sensor 109. For example, by orienting the reflector 105 to face the image sensor 109, the image sensor 109 may measure IR radiation from the imaging system 101 itself (assuming the sensor 109 has IR sensitivity or there is a thermal sensor adjacent to the sensor 109). The imaging system 101 may then make adjustments based on those readings. For example, the imaging system 101 adjusts gain and offset for each pixel, which may produce a higher quality and more accurate image. Image sensors, such as CCD or CMOS or others, typically have fixed pattern noise (FPN) and variations that cause dark current. For example, in CMOS image sensors, pixel transistors cause pixel FPN and column amplifiers cause column FPN. Being able to block light to the sensor 109 and capture a dark image can help calibrate the sensor parameters when desired. Some of these parameters are fixed and factory calibrated but causes of FPN and variations may be temperature dependent and spatially varying.

Multiple Sensors

Figure 5:
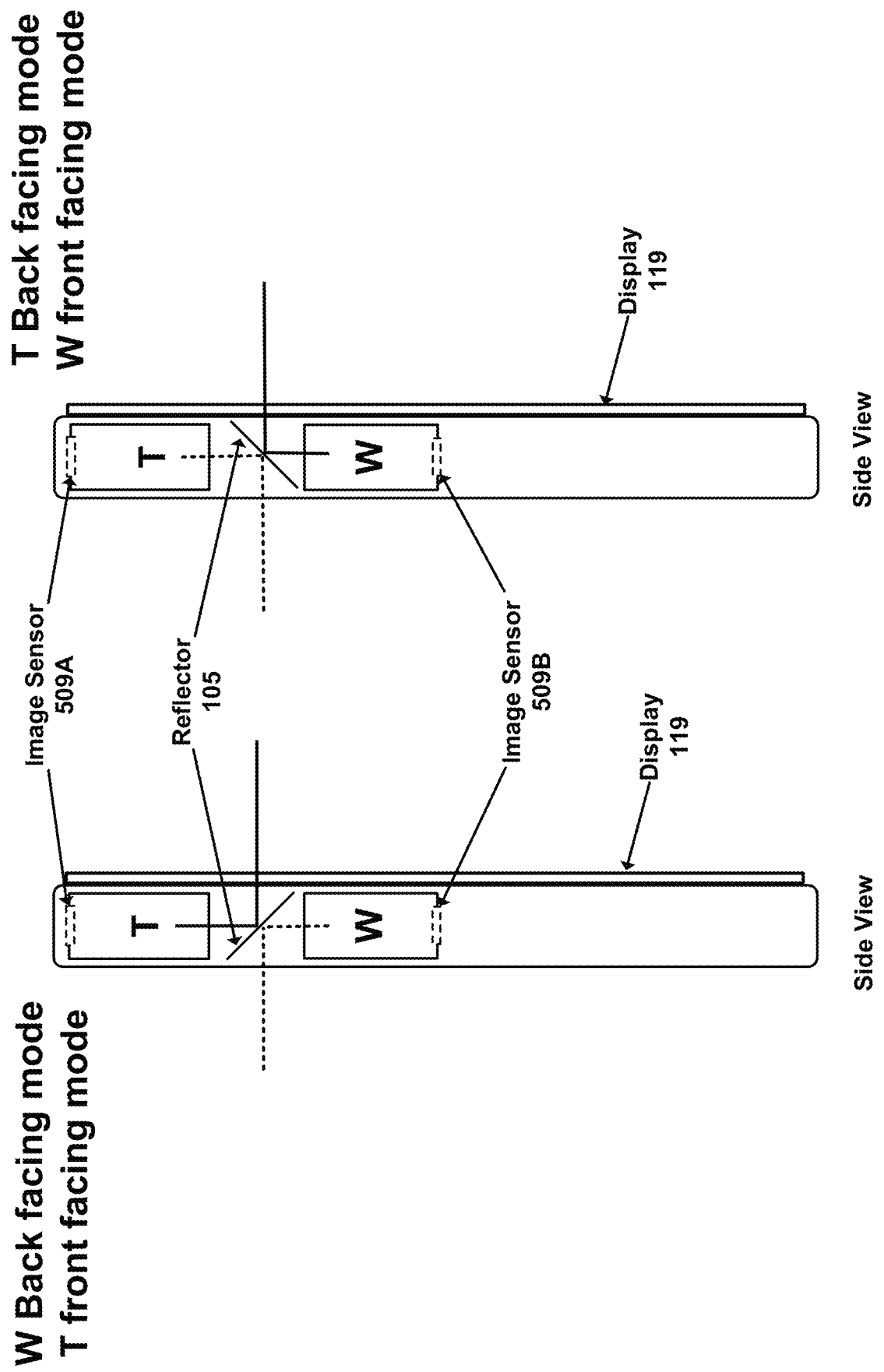
FIG. 5 illustrates the reflector at different positions to direct light towards different image sensors, according to an embodiment.

In some embodiments, the imaging system 101 includes multiple lens modules 107 and image sensors 109. FIG. 5 illustrates a double-sided reflector 105 at different positions to simultaneously direct light upward to image sensor 509A and downward to image sensor 509B. The imaging system 101 in FIG. 5 thus allows images in front of and behind the mobile device to be (e.g., simultaneously) captured using a single reflector 105. By rotating the reflector 105, the controller 113 can direct light from the front or the back of the mobile device to either of the sensors 509. Said differently, the imaging system 101 can include two cameras that share a single reflector 105. This may reduce manufacturing costs and reduce the size of the system. If the sensors 509 or the lens modules are different from each other (e.g., different size, type, optical filter), the reflector 105 can direct light to a specific sensor, for example based on the a given situation or instruction from a user. In some embodiments, the reflector 105 is single-sided (instead of double sided) and it rotates to either direct light to sensor 509A or sensor 509B.

In some embodiments, the bottom lens module 107 and sensor 509B form a wide field of view camera (labelled "W" in FIG. 5) and the top lens module 107 and sensor 509A form a telephoto camera (labeled "T" in FIG. 5) with a narrower field of view. Thus, depending on how the reflector 105 is positioned, it can divert light to the either the W camera or the T camera.

Second (or More) Camera Images

In some embodiments, the imaging system 101 include one or more additional cameras. FIG. 6 illustrates an imaging system 101 that includes a second camera 601 configured to capture images ("second camera images"), according to an embodiment. In the example of FIG. 6, the second camera 601 is positioned in the upper left corner. The second camera 601 is positioned to capture images of the environment behind the mobile device 103, however it may alternatively be positioned to capture images of the environment in front of the mobile device 103. The second camera 601 may be positioned or configured to have a field of view that includes two or more portions captured by the image sensor 109. For example, the view of a second camera image includes the stitching areas of the image strips or is larger than the view of a combined image. This allows the controller 113 to use a second camera image as a reference when processing and combining image strips. For example, a second camera image provides ground truth information for algorithms that process and combine image strips. For example, the controller 113 uses a second camera image to align image strips and correct for motion effects. In another example, the second camera image is used to fill in missing information from the combined image (e.g., caused by occlusions of moving objects in the scene).

Figure 14A:
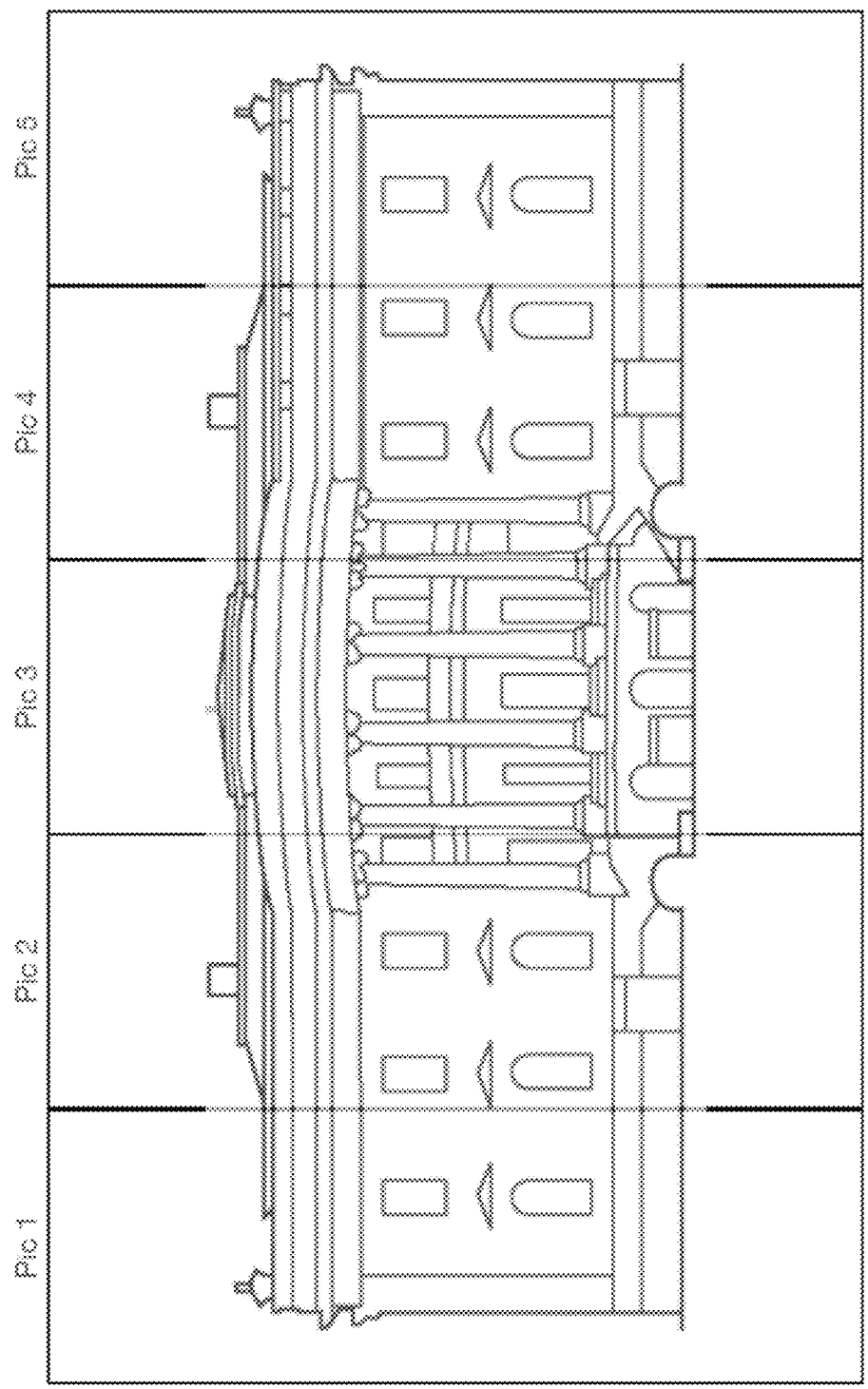
FIGS. 14A-14G illustrate combined images of a house, according to some embodiments.

The advantages of an imaging system 101 with a second camera 601 are further described with reference to FIGS. 14A-14G. FIG. 14A illustrates a combined image that includes a house. The combined image is formed from a set of image strips (Pics 1-5). The image strips were captured while the mobile device 103 was held still. Thus, the image strips may be aligned without any mismatches to form the image of the house.

Figure 14B:
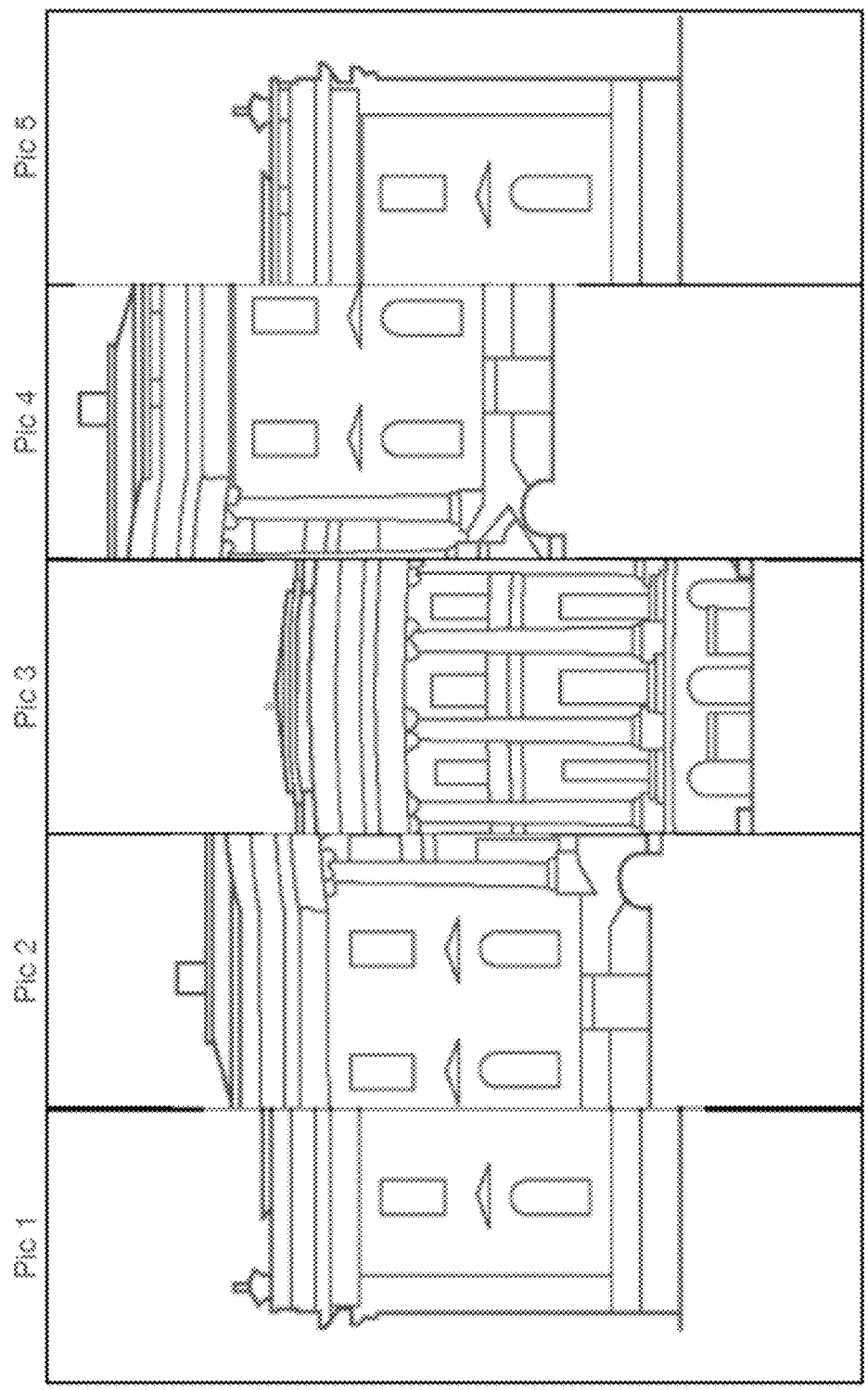

FIG. 14B illustrates another combined image of the house. In this example, the mobile device 103 moved while it was capturing images. For example, a user holding the mobile device 103 unintentionally moved it as it was capturing the image strips. Due to this, portions of the house are not aligned with each other.

Figure 14C:
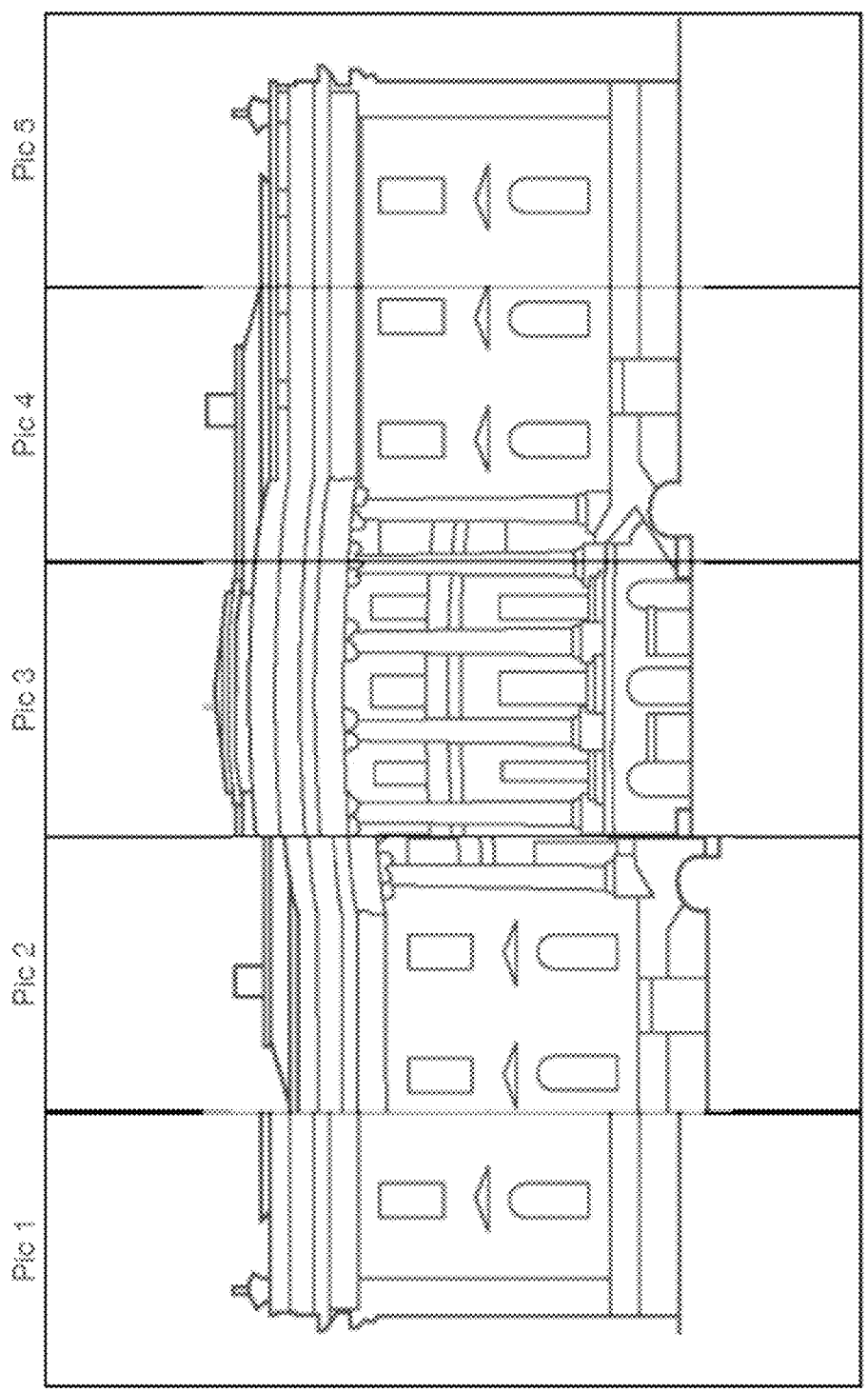

FIG. 14C illustrates another combined image of the house. In this example, the image of the house is improved by aligning features and edges in adjacent image strips with each other. However, feature and edge alignment may not result in the house being fully aligned (e.g., when features are not distinct or if stitching areas lack features).

Figure 14D:
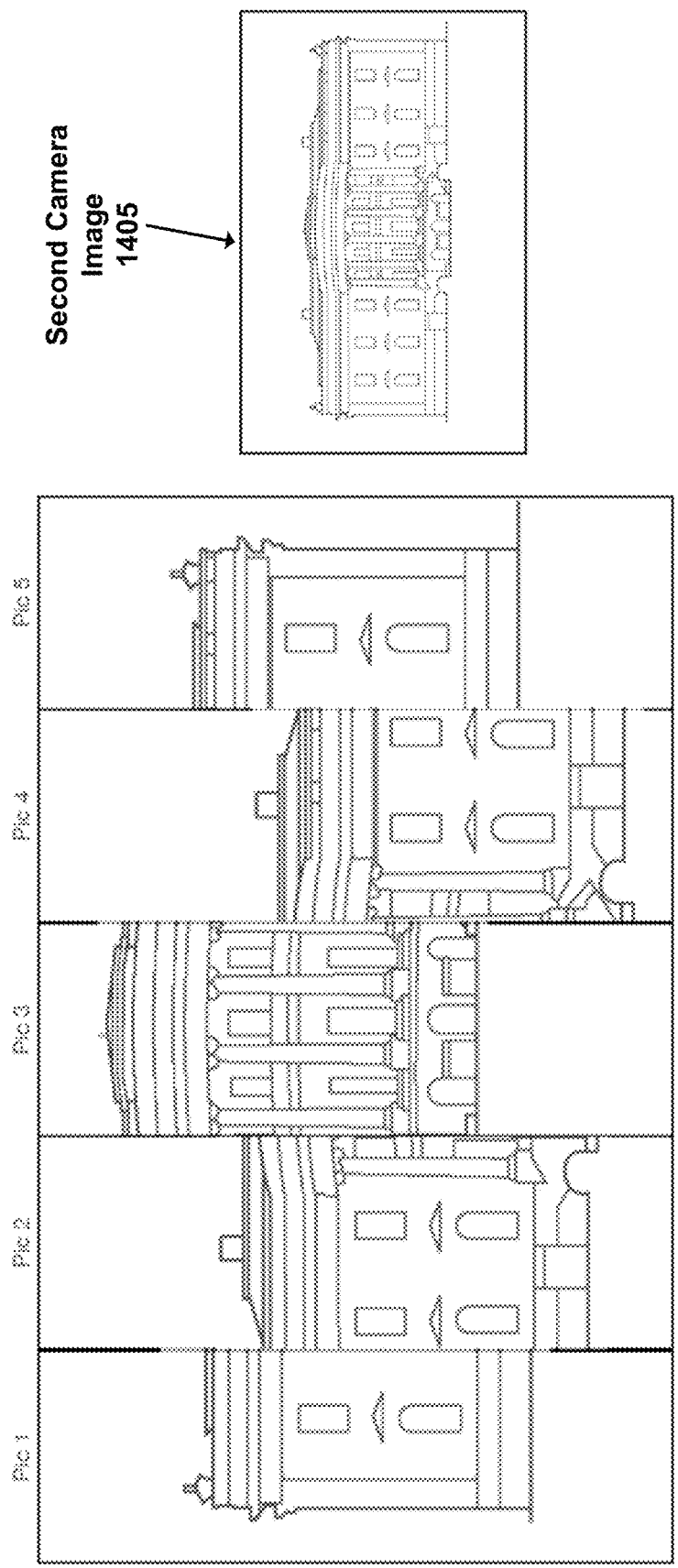
Figure 14E:
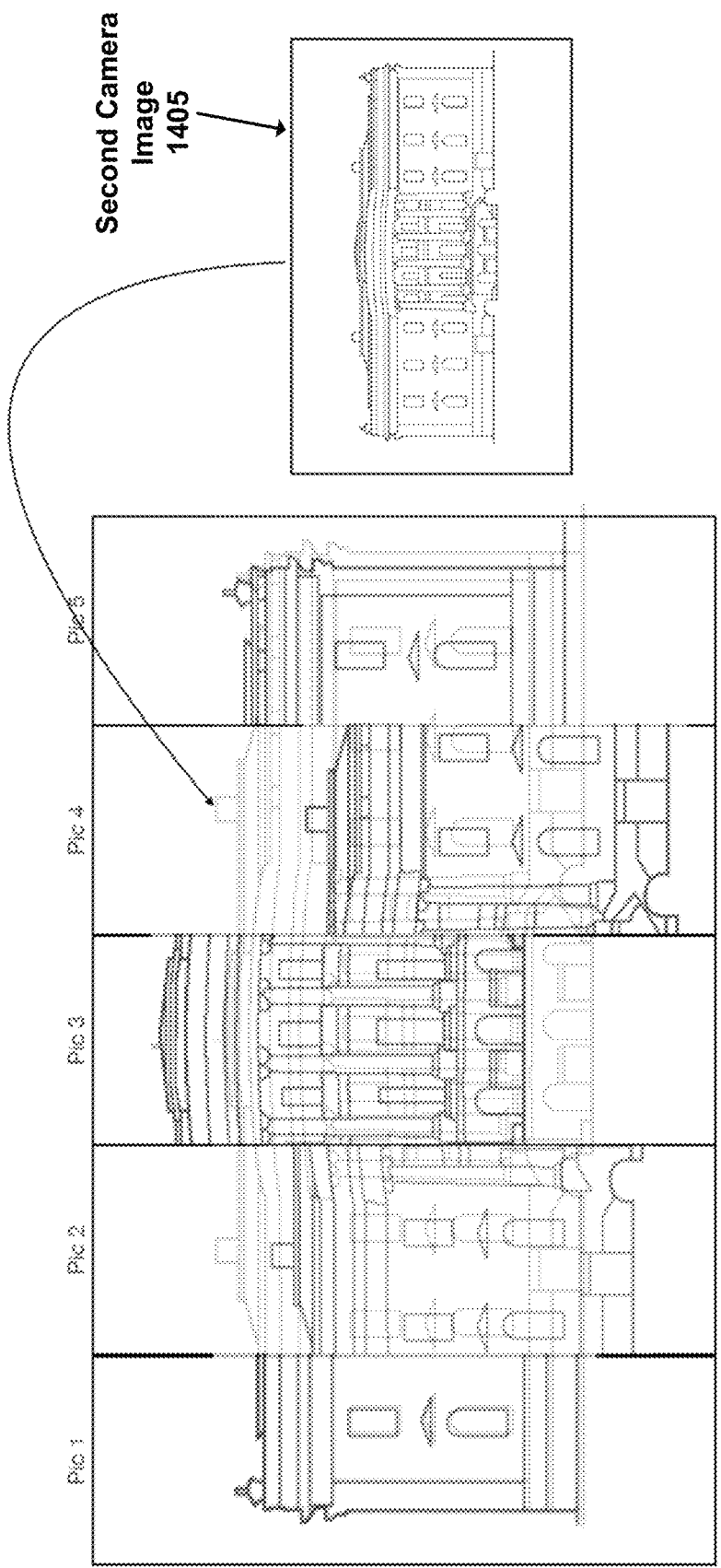
Figure 14F:
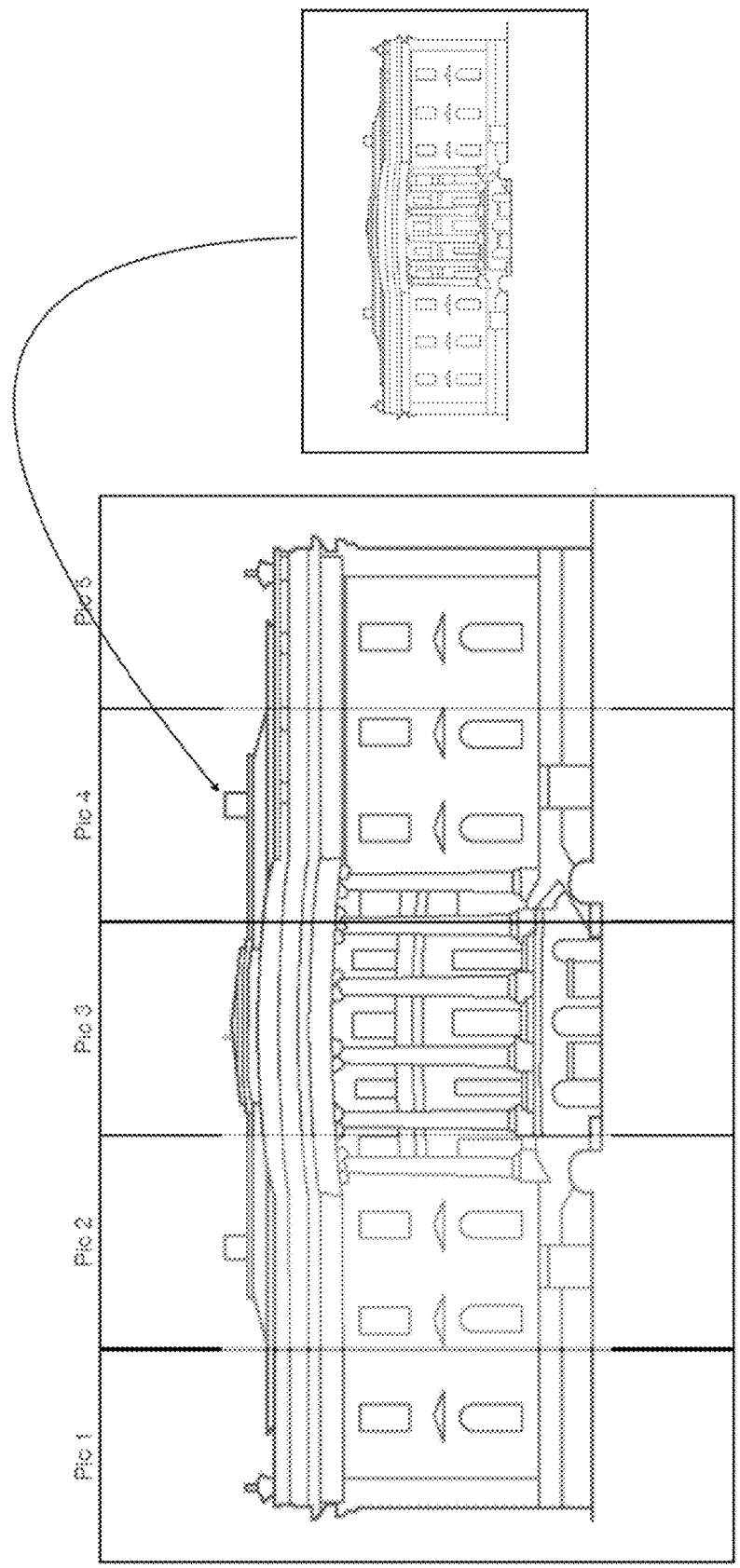

FIG. 14D illustrates a combined image of the house (left image) prior to combining the image strips (Pics 1-5) and an image 1403 captured by a second camera 601 (right image). Since the second camera image 1403 includes the stitching areas of the image strips, it can be used to improve the image strip combination process. For example, as seen in FIG. 14E, the second camera image 1403 is temporarily enlarged and overlaid onto the image strips to act as a reference or template for aligning the image strips. By doing this, the alignment of the image strips is improved (e.g., as seen in FIG. 14F), and thus, the combined image of the house is improved (e.g., compare the combined image in FIG. 14F with the combined image in FIG. 14C). In some embodiments, since second camera images may lack resolution and may be noisy compared to the image strips, after coarse positioning of the image strips, a fine alignment may be added to improve edge continuity between the image strips.

Figure 14G:
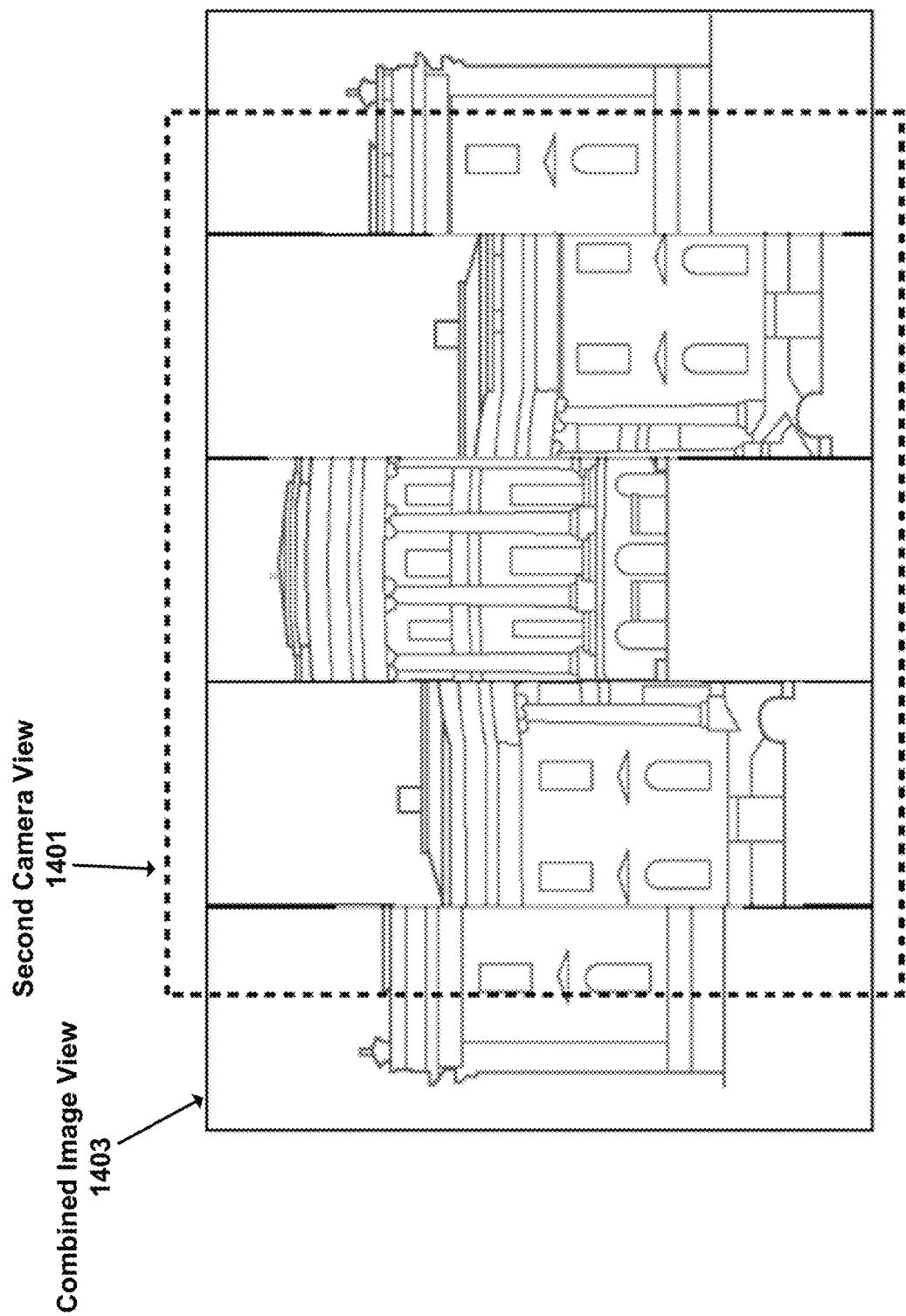

FIG. 14G illustrates an example field of view 1401 of the second camera image compared to an example field of view 1403 of the combined image. In this example, view 1401 is smaller than view 1403 in the horizontal direction, however it still includes the stitching areas of the combined image. In some embodiments, view 1401 is larger than view 1403 in the vertical direction (e.g., as seen in FIG. 14G) so that the second camera image includes stitching areas even if the mobile device moves during the capturing process. The horizontal direction of view 1401 also may be sized to account for movement in the horizontal direction. In some embodiments, view 1401 includes the entire view 1403 of the combined image.

Image Combining

This section describes how image strips may be combined (also referred to as registration). There may be two challenges to registration. A first challenge is registering a static scene, where the scene and the imaging system 101 are not moving or changing during the capture of the image strips. For this case, the registration may desire alignment of the image strips so that the features on the borders of the strips (which is the stitching area) are continuous after stitching. Since there is no motion in this case, the stitching may be performed using feature matching operations, such as Sum of Absolute Differences (SAD), correlation, or a neural network that is trained to align image details. It may be applied to the gradient of the image strip or directly on the signal itself. There may be cases in which the stitching area (or line) does not include of features or edges that are distinct enough. In that case, a second camera image (captured by the second camera 601) may be used as a stitching guide. In this case, the feature matching may not be limited to the stitching area and may be achieved using features that lie anywhere within the image strip that is being registered.

In some cases, motion by the imaging system 101 or objects in the scene occurs. This may lead to non-continues stitching (e.g., each image strip is shifted by a different amount and in different direction to form a continuous combined image). Registration may be performed using dense optical flow registration algorithms, however these can be computationally intense and may have errors. Using a second camera image from the second camera 601 may make this registration simple as there may be no need to find solution that seems continuous (e.g., such as a part of a human hand that needs to match another part) but only register areas to their corresponding similar areas in the second camera image.

Another possibility for stitching complex textures is leveraging the overlap that is created during the image strip capture by rotating the reflector 105 slightly less that the field of view. In such cases, objects near the stitching line may appear in both image strips on both sides of the stitch line and stitching may occur on a curve (e.g., a non-straight line) such that it avoids passing through objects like faces or other objects that can be detected using a detection algorithm. When objects in the scene move in between the exposures of the different image strips, occlusions may occur. This may cause some area in the scene to be blocked by an object that is closer to the imaging system 101. Having different information in two image strips may make it difficult to stitch properly without having artifacts visible. The use of a second camera image can serve as guide and can be captured at same time as one of the image strips corresponding to a certain reflector position which is typically be the central one (e.g., the position closest to 45 degrees) in order to fill in missing information for areas that were occluded due to motion. The second camera image may have different properties in terms of noise, colors and more, so a normalization process may be performed before blending in information from the second camera image into the stitched picture. Such normalization may include noise removal, color and tone manipulation, blur, etc.

Reflector Modifications

In some embodiments, one or more sides of the reflector 105 include an optical filter. Referring now to FIG. 7, it illustrates a two-sided reflector 105 with a filter 701 on one side, according to an embodiment. A reflector 105 with a filter 701 on one side allows the controller 113 to select whether to capture an image with filtered or unfiltered light. While FIG. 7 illustrates a reflector 105 with a single filter 701, a filter may also be present on the opposite side (e.g., a different filter). Additionally, note that the size of filter 701 in FIG. 7 is exaggerated for illustrative purposes. For example, the filter 701 is a thin coating applied to a surface of the reflector 105.

Example filter types include a polarizer, a chromatic filter, neutral density filter, a UV (ultraviolet) filter, a wavelength filter (e.g., a color filter, a narrow band IR (infrared) filter or a broadband IR filter). If the filter 701 is an IR filter, the imaging system 101 can capture an image with or without IR light. Images captured with IR light may be used to collect depth data (as described below with reference to FIG. 9) or for low light photography (recording a broader spectrum may improve the image quality). The controller 113 may determine whether to filter light via the reflector 105 based on the light levels in the scene, the type of light in the scene, and a whether depth data is desired (e.g., by a user or application).

Instead of selecting between capturing an image with filtered or unfiltered light, the controller 113 may rotate the reflector 105 so that every other combined image includes filtered light. For example, after completing a scan, the reflector 105 continues to rotate so that its opposite side directs light for the subsequent scan. Thus, depending on the type of filter 701, every subsequent combined image may include a different wavelength. Flipping the reflector 105 between scans may be performed while capturing video. For example, if the filter 701 is an IR filter, every second combined image includes IR information. This IR information may be coupled with structured light or time of flight (ToF) information to create depth data that is accurate and aligned with the color data from the other combined images.

In some embodiments, the reflector 105 is two-sided and one of the sides deviates from axis 115 by a predetermined distance. By flipping the reflector 105 between scans, subsequent images may have different reference points of view. The controller 113 may use the images with different reference points of view to perform a stereo depth calculation, for example, in the same way that depth is calculated from two different side by side cameras.

In some embodiments, a side of the reflector 105 includes a lens that changes the focal length along the narrow dimension of the image sensor 109. This may be useful for recording high-frame-rate videos that require the reflector 105 to rotate at a rate faster than the motor 111 can support. In these situations, the side of the reflector 105 with the lens may be used to direct light so that the field of view in the narrow dimension is increased by a factor (e.g., three). This may allow the reflector 105 to stay relatively static during the capturing of the video. This may also eliminate the image strip combination process. An alternative way of achieving this, is by adding a lens or lens group that slide in and out of the optical path based on the mode the imaging system 101 is in.

Dual Lens System

FIG. 8 illustrates a dual lens imaging system 801, according to an embodiment. The dual lens imaging system 801 includes two windows 803 that are spaced apart, two lens modules 807, two reflectors 805, and a single image sensor 809. Light passing through the top window 803A is directed downwards by the top reflector 805A and through the top lens module 807A. After passing through the top lens module 807A, the light is directed by the top fixed mirror 811A to the top half of image sensor 809 (also referred to as a first portion of the sensor 809). The plane of the image sensor 809 is parallel to the plane of the display 119 (e.g., in the yz-plane). The bottom half of the dual lens imaging system 801 may be a mirror image of the top half. For example, light passing through the bottom window 803B is directed upwards by the bottom reflector 805B and through the bottom lens module 807B. After passing through the bottom lens module 807B, the light is directed by the bottom fixed mirror 811B to the bottom half of image sensor 809 (also referred to as a second portion of the sensor 809). As illustrated in FIG. 8, the imaging system 801 directs light from both windows 803 onto a single image sensor 809. Due to this and the image sensor plane being parallel to the display, the image sensor 809 may be larger than the image sensor 109 described with reference to FIGS. 1A and 1B. Having a single image sensor 809 may reduce the number of electronic components of the system 801. In some embodiments, the system 801 includes two image sensors, for example by removing the fixed mirrors 811 and adding a top sensor in the xy-plane that faces upwards and adding a bottom sensor in the xy-plane that faces downwards.

By having two windows 803 that are spaced apart, the system 801 may produce combined images with a larger field of view of the external environment than combined images produced by a system with a single reflector (e.g., as illustrated in FIG. 1B). For example, the top reflector 805A directs light to the image sensor 809 that the bottom reflector 805B is unable to direct. Similarly, the bottom reflector 805B may direct light to the image sensor 809 that the top reflector 105A is unable to direct. In some embodiments, the spacing between the windows 803A and 803B on the housing is reduced to reduce changes in point of view when a user switched between cameras, however a change in point of view may become less noticeable for objects that are farther away. In example embodiments where a single sensor (e.g., sensor 809) is used for two lens modules, the spacing between the windows 803 may be larger. This may be advantageous in cases where one or both of the lens modules 807 have larger focal lengths (larger focal lengths may enable the system to image objects that are farther away).

The windows 803 of the dual lens imaging systems 801 may enable the system 801 to determine depth information by comparing images captured from the different windows 803. Stereo principles and the distance between the windows 803 may determine the depth accuracy and range. For example, larger window 803 separation allows for the calculation of depth information at larger distances. If the windows 803 are separated by several centimeters, the system may determine depth information of objects that are tens of meters away and even beyond 100 meters.

Image Sensor with Pixel Groups

In some embodiments, the image sensor 109 includes different groups (e.g., rows) of pixels, such as pixels with IR filters, pixels with polarizing filters, and pixels with broad band filters, ToF pixels, and visible light pixels ("color pixels"). An image sensor 109 may include any combination of different pixel groups. Example image sensors 109 with different pixel groups are further described below.

Figure 9:
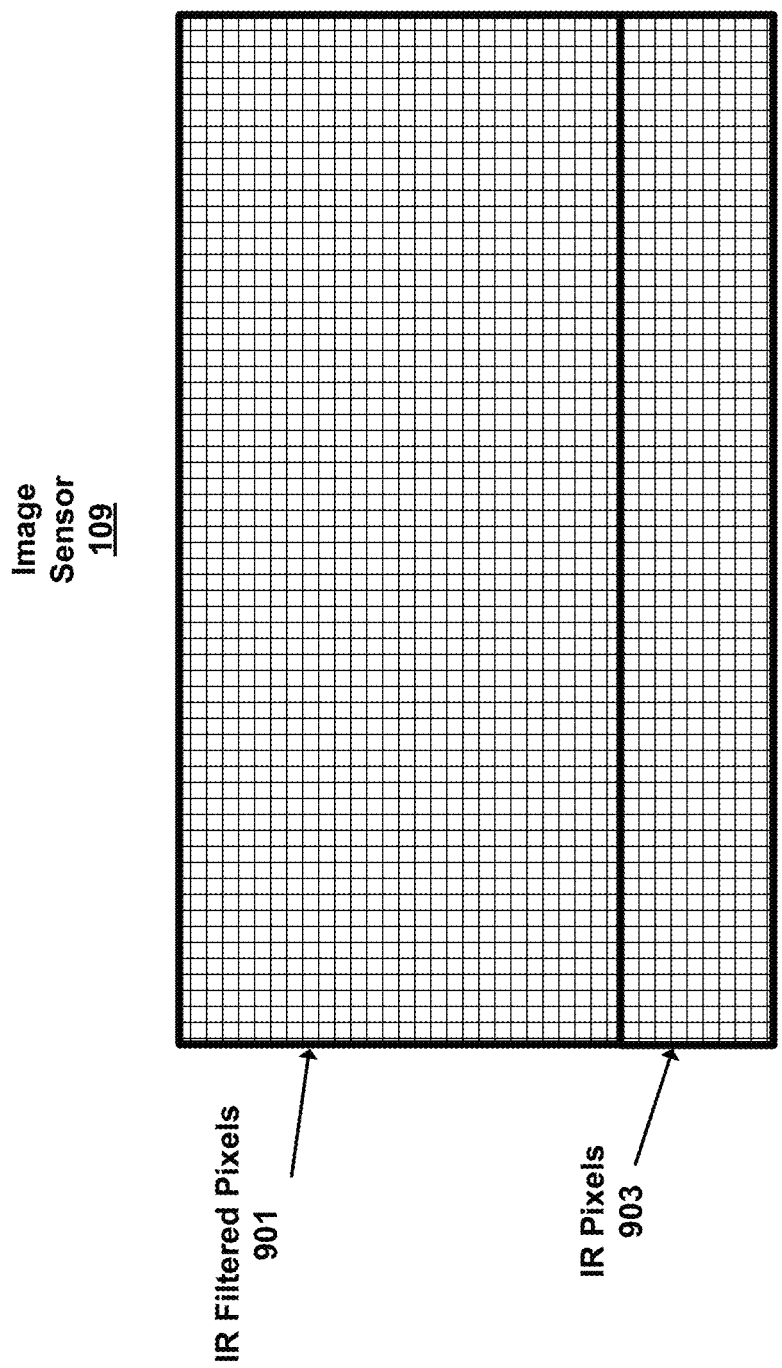
FIGS. 9-11 illustrate groups of pixels on image sensors with various optical filters, according to various embodiments.

FIG. 9 illustrates an image sensor 109 including a first group of color pixel rows with an IR filter ("IR filtered pixels 901") and a second group of color pixel rows without an IR filter ("IR pixels 903"). Thus, IR pixels 903 may record IR information. IR information can be used to create depth data, for example, by means of structured light when the image system 101 is coupled with a pattern projector or by means of ToF when the image system 101 is coupled with a timed IR light source.

The imaging system 101 (e.g., via controller 113) may use the recorded IR information to create a depth map and overlay it on a color image captured by the IR filtered pixels 901. Because the IR information was recorded on the same image sensor 109 as the color image, the IR information may have a similar view as the color image. Thus, the alignment of the depth map may be more accurate than conventional systems. This may be useful for synthetic depth of field applications (also known as portrait mode) which emulate optical blur based on depth information. Conventional systems create a depth map by combining data from a color camera and a separate IR camera. Due to this, the IR camera will have a different view of the external environment and thus, the alignment of the depth map with a color image may be less accurate.

To record sufficient IR information, only a few pixel rows may be used to record IR wavelengths. The ability to use only a few sensor rows and get useful IR information from the scene is enabled by the fact that the reflector 105 can scan the scene such that the IR pixels 903 capture several strips that, when combined together, cover a large desired field of view.

Figure 10:
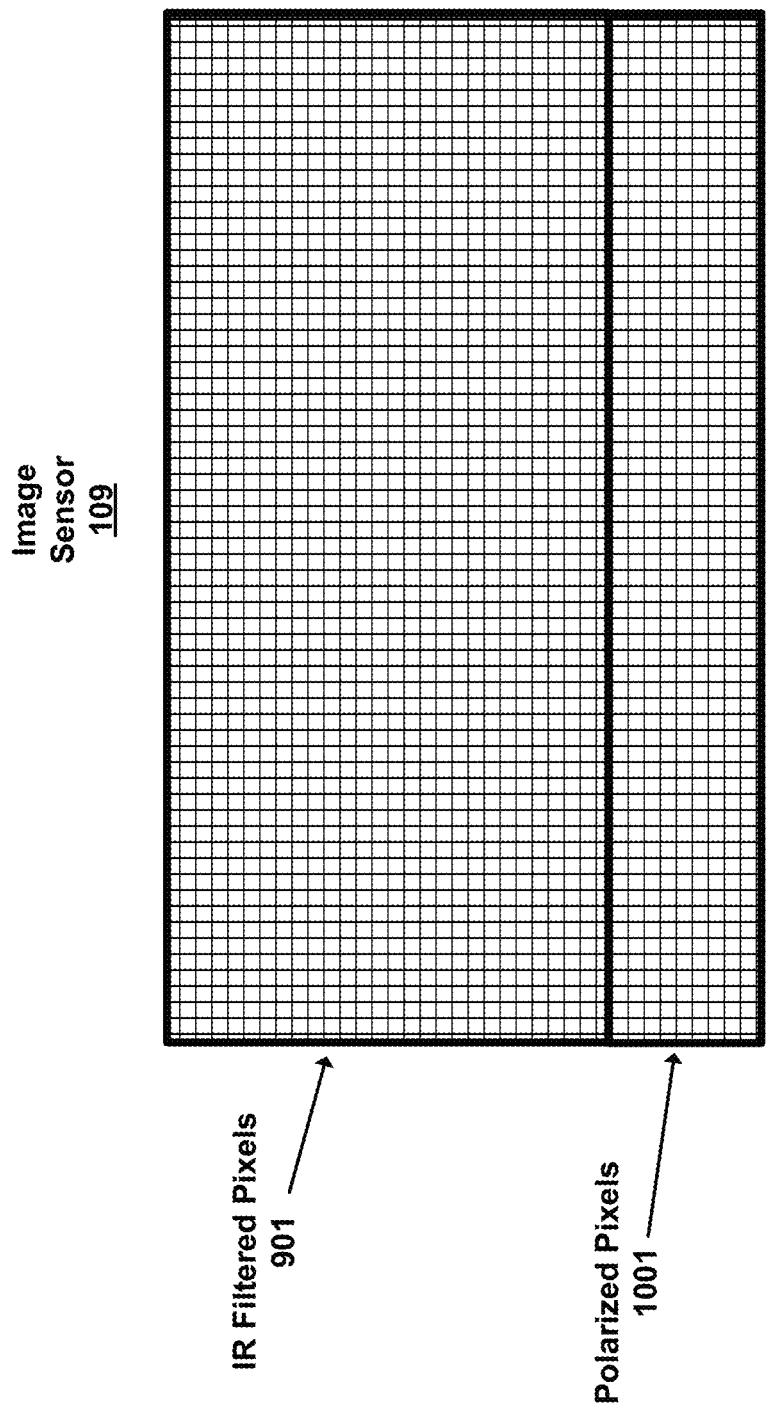

FIG. 10 illustrates an image sensor 109 including a first group of IR filtered pixel rows 901 and a second group of color pixel rows with an IR filter and a polarizing filter or coating ("polarized pixels 1001"). Capturing polarized light may be beneficial for improving image appearance, for example, the appearance of the sky has deeper color distinctions and/or surface reflections are removed from water or other reflective surfaces.

Figure 11:
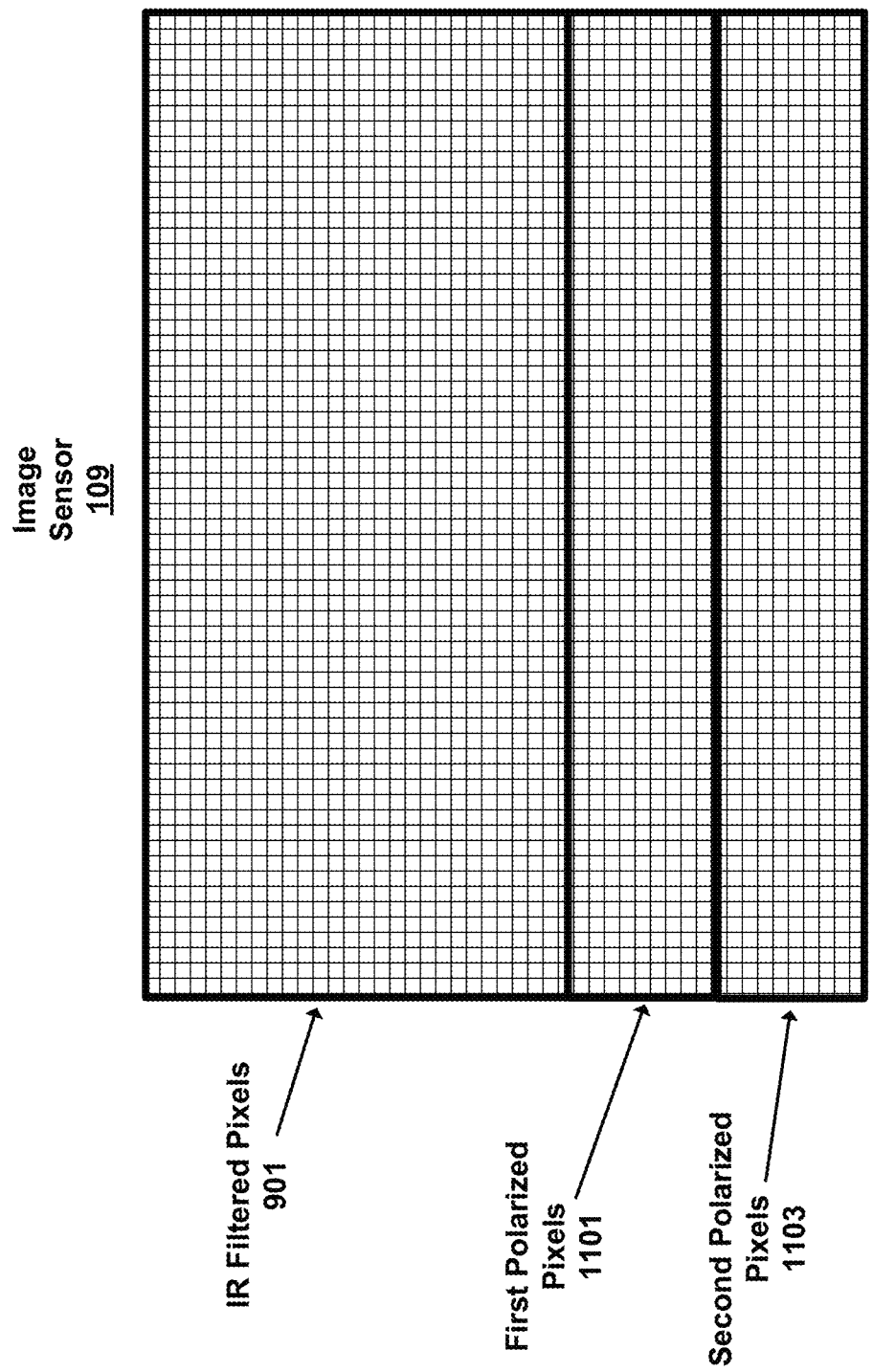

FIG. 11 illustrates an image sensor 109 including a first group of IR filtered pixels 901, a second group of color pixel rows with an IR filter and a first polarizing filter ("first polarized pixels 1101"), and a third group of color pixel rows with an IR filter and a second polarizing filter ("second polarized pixels 1103"), where the second polarizing filter has a polarization direction that is orthogonal to a direction of the first filter. This may allow the imaging system 101 to achieve a desired polarizer filter effect regardless of whether the imaging system 101 is oriented horizontally or vertically.

In embodiments where the image sensor 109 includes rows of polarized pixels and unpolarized pixels, the imaging system 101 may use unpolarized pixel data to enhance the image quality of a polarized image (formed using polarized pixel data). For example, the imaging system 101 uses an algorithm to compare polarized pixel data associated with a view of the external environment with unpolarized pixel data associated with the same view. This may be advantageous because polarized images may have a lower quality, for example when imaging low light scenes.

In some embodiments, the image sensor 109 includes rows of monochrome pixels with a broad band filter which allows pixels to detect IR and/or ultraviolet wavelengths. The wavelength range of the filter may control the amount of light detected by these monochrome pixels. These monochrome pixel rows may be used to capturing more light for low lighting conditions and also to improve resolution and edge fidelity in all lighting conditions.

In some embodiments, the image sensor 109 includes one or more pixel groups with a neutral density filter. When such an image sensor 109 is used, the scanning may be applied such that a desired field of view is imaged by a pixel group without the neutral density filter and by a pixel group with the neutral density filter. By doing this, the images can be fused to provide an HDR (high-dynamic range) output by combining the pixel data from each of the pixel groups.

In the case of discrete scanning schemes, the reflector 105 makes stops for exposures during the scanning. The stopping position of the reflector 105 may depend on the size of each pixel group and the desired field of view for the combined image, which may change based on a desired zoom level. For example, if the image sensor 109 has 3,000 pixel rows in a first pixel group and 3,000 pixel in rows a second pixel group, if each group corresponds to 10 degree field of view in the scanning direction, and if the desired field of view in the scanning direction is 60 degrees, then the reflector 105 may stop in six different positions to cover the 60 degree field of view with the first pixel group.

The imaging system 101 may have different scanning schemes to ensure coverage of a scene by different combinations of pixel groups. For example, if the controller 113 is instructed to form a depth map, the controller 113 initiates a first scheme to direct portions of a scene to color pixels and to IR pixels on the image sensor 109. However, if a depth map is not desired (e.g., for a different application), the controller 113 may initiate a second scheme to only direct the portions of the scene to the color pixels. The imaging system 101 may initiate a specific scanning scheme based on one or more factors, such as external light conditions, system logic, user instructions, and/or application instructions.

Example Lens Module

In some example embodiments, a desired output aspect ratio of an image strip is different than an aspect ratio of the image sensor 109. For example, the imaging system 101 images a scene with an aspect ratio of 4:3 or 16:9 (or other desired ratio) onto an image sensor 109 with a much higher aspect ratio, such as 5:1 or 10:1.

To do so, the lens module 107 may have different focal lengths along the X and Y axes (Z is the optical axis). Achieving different focal lengths may be done by using freeform optical elements (also known as anamorphic lenses) or by using cylindrical optical elements which have optical power only in one direction. As a result of using such a lens module 107, each pixel on the sensor (assuming it's is a symmetrical pixel (e.g., square shape)) may collect photons from a rectangular area in the scene.

To achieve similar resolution in the X and Y directions, it may be advantageous for the image sensor 109 to have nonsymmetrical pixels (e.g., rectangular pixels). Another option is to apply analog or digital binning (e.g., by the controller module 113) in the longer dimension (e.g., along the y-direction) of the image sensor 109 to reduce the resolution in that dimension to a resolution that corresponds to the desired output aspect ratio.

To design a lens module 107 with different focal lengths in the two dimensions perpendicular to the optical axis, at least two of the lens element surfaces may be asymmetric. Using only one asymmetrical surface may result in a different focal length but may also result in a different focus plane, which may make it difficult or impossible to capture an image using a single image sensor 109. Thus, in these embodiments, the lens module 107 may have an optical design with at least two optical surfaces with non-symmetrical surfaces.

Figure 15:
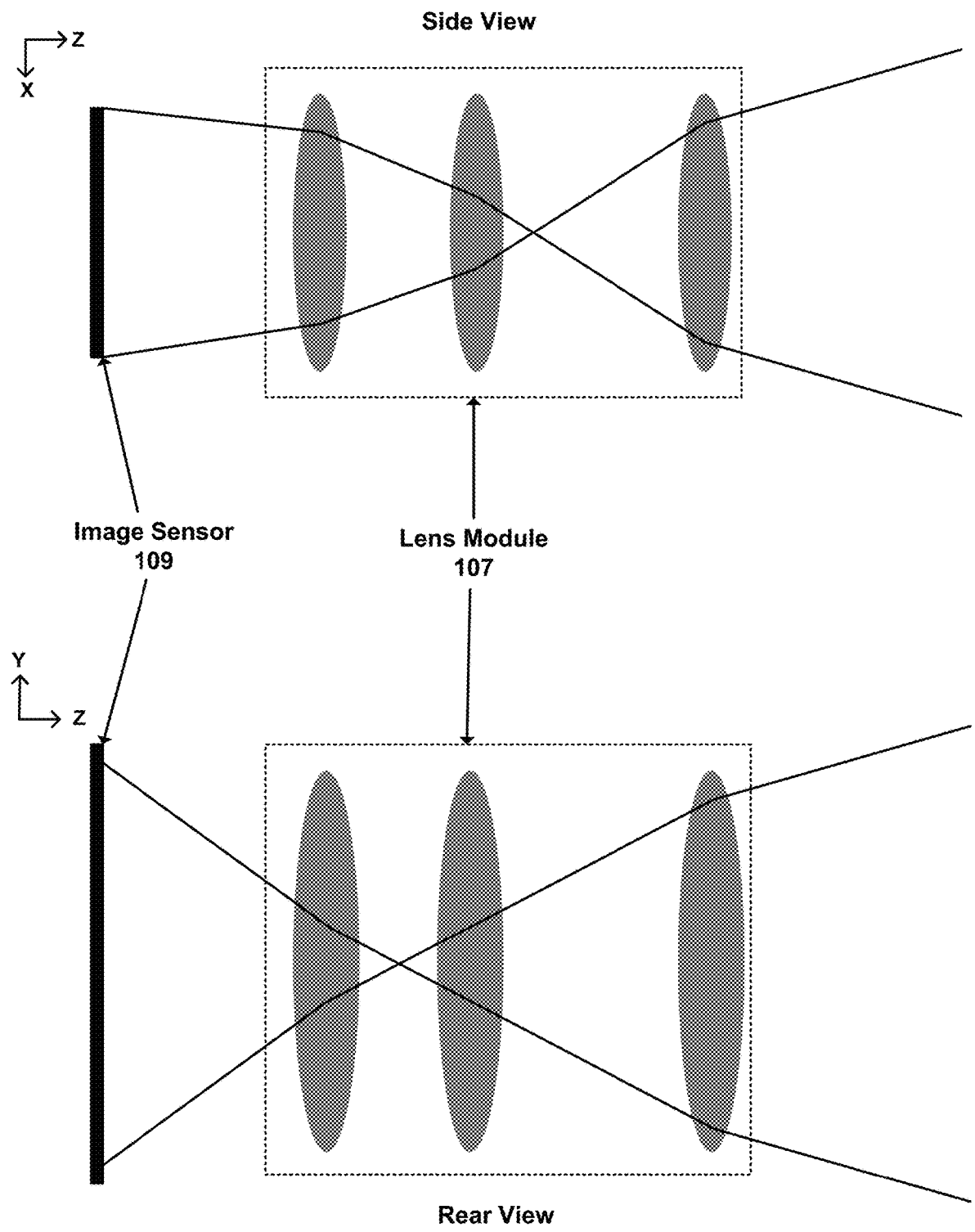
FIG. 15 illustrates views of a lens module and an image sensor, according to an embodiment.

For example, FIG. 15 shows a side view and a rear view of an example lens module 107 and image sensor 109, according to an embodiment. The image sensor 109 has a high aspect ratio, which can be seen by comparing its length along the x- and y-axes. The example lens module 107 in FIG. 15 has three lens elements. The lens module 107, has a shorter focal length in the xz-plane and a longer focal length in the yz-plane. To do this, the lens module 107 in FIG. 15 may have at least two nonsymmetrical lens elements (not illustrated) to ensure that the lens module 107 can focus an image onto the plane of the image sensor.

Image Sensor with Micro Lens Array

In some embodiments, the imaging system 101 includes a lens array (e.g., a micro lens array) above or on the image sensor 109. A lens array is an array (e.g., grid) of lenses (e.g., micro lenses) that focus light onto the pixels of the image sensor 109. Each lens may focus light on to a subset of pixels on the image sensor (e.g., 2, 3, or 4 pixels). In some embodiments, a lens of the array focuses light onto a group of two or more pixels in a long dimension of the sensor (e.g., along the y-axis). This may result in a disparity between a left and right pixel in each group below a lens of the array. Using more than two pixels under each lens may be advantageous in terms of the imaging system's 101 ability to derive depth information from the raw image data as each pair of pixels will have an effective baseline that is different in its size. This is further described below.

In this context, disparity may refer to the offset of an object's location in one image compared to another. For example, if each lens of a lens array is over a separate group of two pixels, the imaging system 101 can create two images. For example, a left image is captured by the left pixels under the lenses and a right image is captured by the right pixels under the lenses. The left and right images have disparity between them, similar to a stereo camera, because the left pixels 'see' the external environment through the left side of the lens apertures and the right pixels 'see' the external environment through the right side of the lens apertures. If each lens covers a group of three pixels, the imaging system may create three images (e.g., a left, right, and center image) to extract disparity information from.

A lens array may be used for phase detection and the creation of a stereo view from within the aperture. Because of the asymmetrical aperture of the lens module 107, the different pixels may provide different disparity information. In the larger dimension of the image sensor plane, the disparity may be large while in the smaller dimension the disparity may be small. Determining disparity information may be beneficial for a depth calculation algorithm and for focusing (e.g., for phase detection auto focus (PDAF)). For depth calculation, it is useful to have large and small disparity information as to reduce errors, reduce occlusion effects, and extend the range in which depth can be calculated. Thus, the use of a lens array may allow for auto focusing in short ranges (e.g., less than a meter) and long ranges (e.g., 2-10 meters).

Figure 16A:
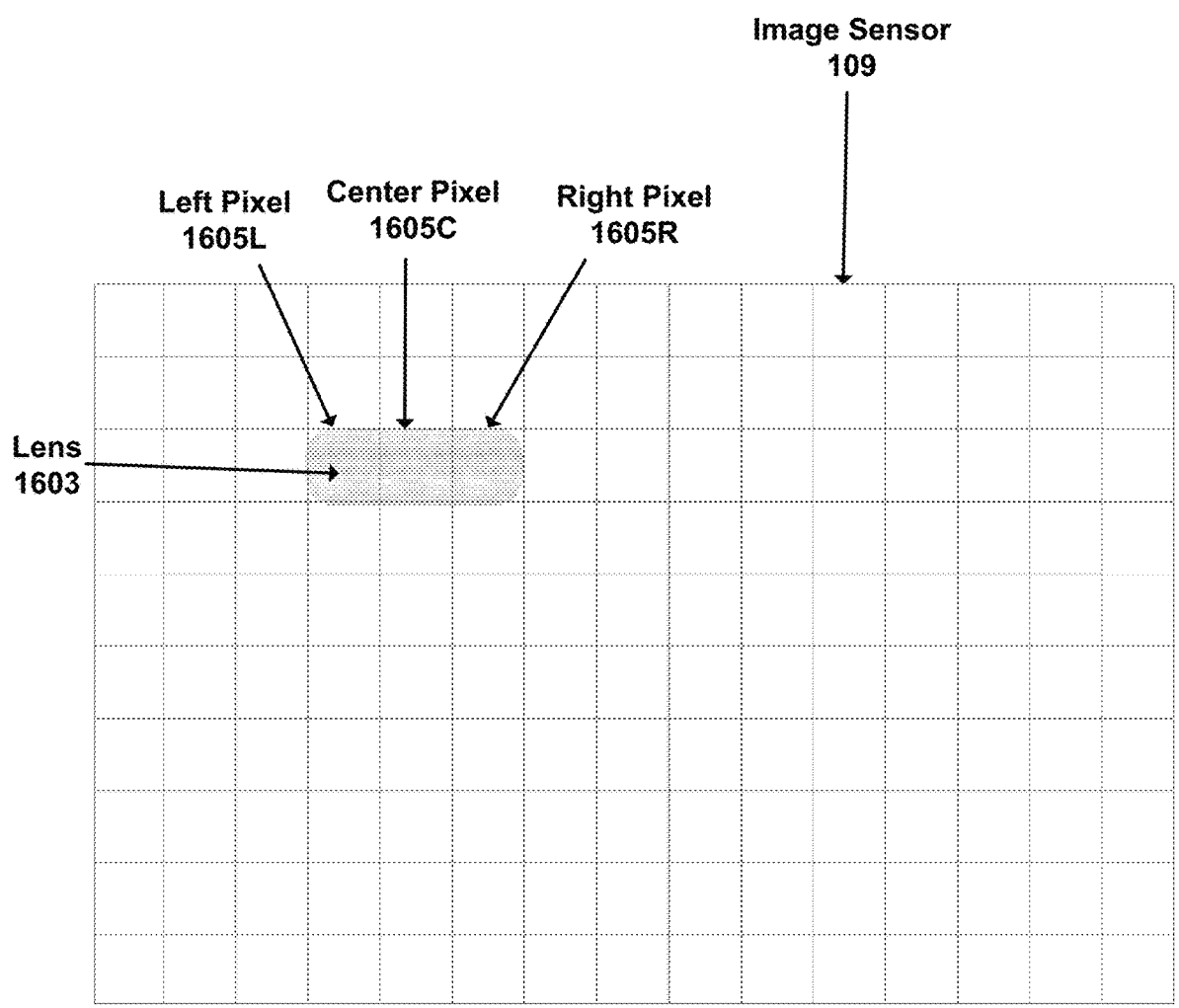
FIGS. 16A and 16B illustrate a lens of a lens array over a group of pixels of an image sensor, according to some embodiments.
Figure 16B:
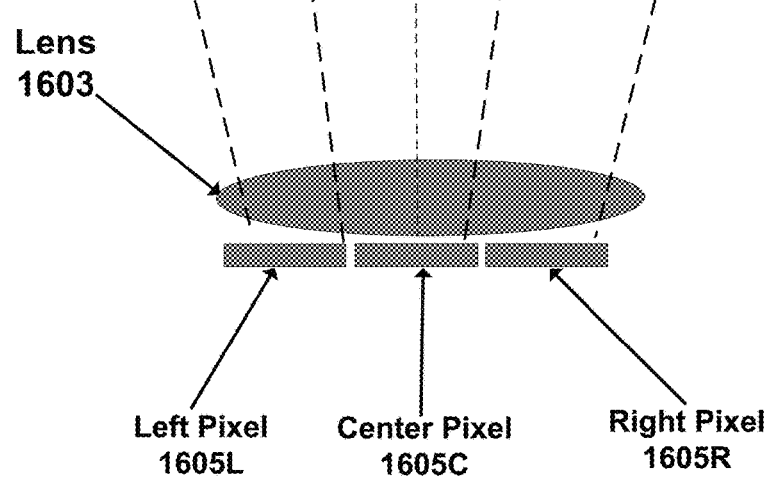

For example, FIGS. 16A and 16B show a lens 1603 of a lens array over a group of pixels of the image sensor 109, according to some embodiments. For illustration purposes, only a single lens 1603 of the array is shown. In some embodiments, a lens array includes enough lenses to cover all of the pixels of the sensor 109. In the examples of FIGS. 16A and 16B, the lens 1603 covers three pixels in a row (pixels 1605L, 1605C, and 1605R). Photons propagating through the left side of the lens 1603 are received by the left pixel 1605L, photons propagating through the right side of the lens 1603 are received by the right pixel 1605R, and photons propagating through the center of the lens 1603 are received by the center pixel 1605C. Due to this, it is possible to calculate disparity information using any pair of pixels from the group of pixels 1605. This may be useful for focusing purposes and depth quality. The disparity between the right pixel 1605R and left pixel 1605L may be the larger while the disparity between the left or right pixel and the center pixel 1605C may be smaller. Among other advantages, using information from the different baseline pairs may help increase the range in which depth can be calculated and increase its accuracy.

Color Filter Array

In some embodiments, the image sensor 109 includes a color filter array (CFA). A CFA is different than the usual Bayer pattern or other patterns, such as RGBY, which are often used with CMOS sensors. In a CFA, each color filter covers more than one pixel and the number of covered pixels corresponds with the aspect ratio difference. For example, an image sensor 109 with an aspect ratio of 8:3 that receives light directed by an anamorphic lens (e.g., in module 107) which images a scene with an aspect ratio of 4:3 would have a CFA that covers two pixels in the longer sensor dimension (e.g., along the y-axis) and one pixel in the smaller sensor dimension (e.g., along the x-axis). Another example is an image sensor 109 with aspect ratio of 12:3 that receives light directed by an anamorphic lens (e.g., in module 107) that images a scene with an aspect ratio of 4:3, would have a CFA that covers three pixels in the longer sensor dimension and one pixel in the shorter smaller dimension (e.g., see FIG. 17). A CFA is beneficial for the purpose of being able to bin the pixels which are of the same color properties while also allowing PDAF (phase detect auto focus) using pixels of the same color family.

Figure 17:
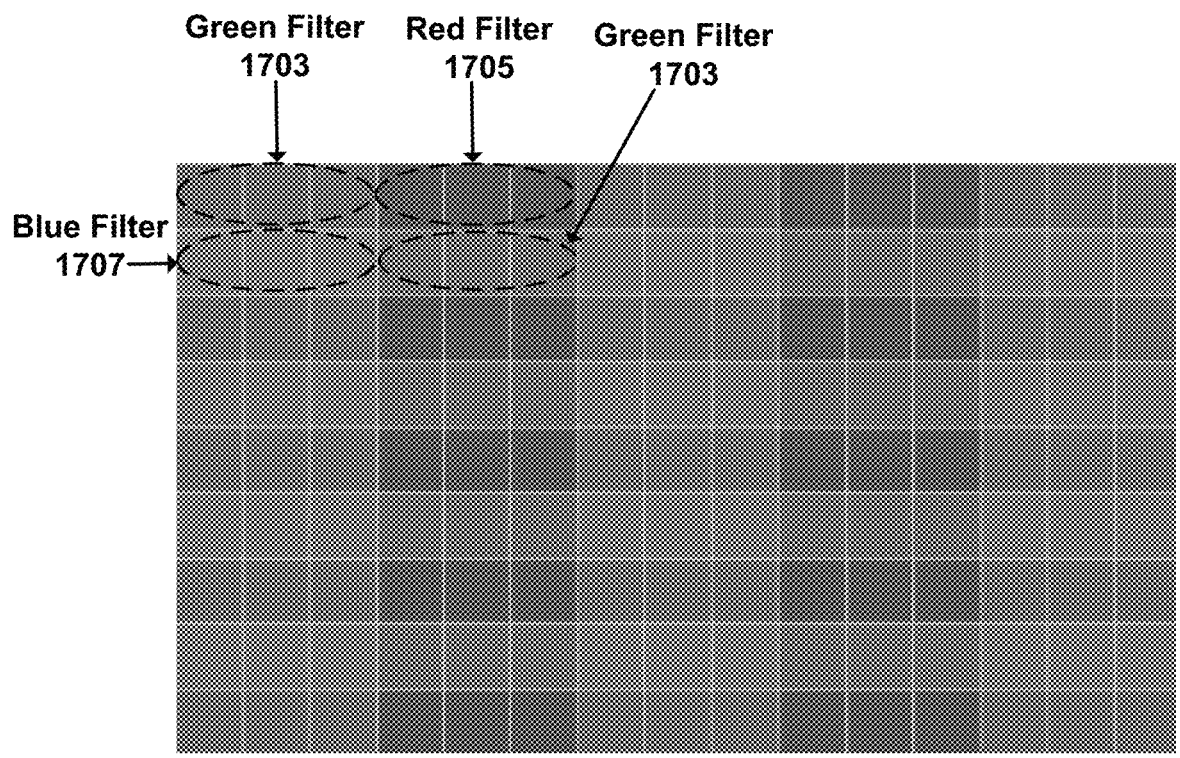
FIG. 17 illustrates a color filter array on an image sensor, according to an embodiment.

For example, FIG. 17 shows and example CFA on an image sensor 109, according to an embodiment. The CFA includes a pattern of red filters 1705, green filters 1703, and blue filters 1707 over the pixels of the sensor 109. Each color filter covers a group of three pixels in a horizontal row. This results in a distribution with an aspect ratio that corresponds to the focal length difference of an asymmetric lens (e.g., in the lens module 107). While the CFA is described with reference to the imaging system 101, a CFA can be used in other imaging systems. For example, a CFA can be used in imaging systems that have aspect ratio differences between a lens and an image sensor.

In some embodiments, the imaging system 101 includes a lens array and a CFA. An image sensor with lenses of the array that each cover 4 pixels grouped as 2×2 may be referred to as a "quadra" when a CFA is also applied in a 2×2 distribution, meaning that the each 2×2 group of pixels has a color filter (e.g., red, green, or blue) applied on them.

Dichroic Beam Splitter

Figure 18:
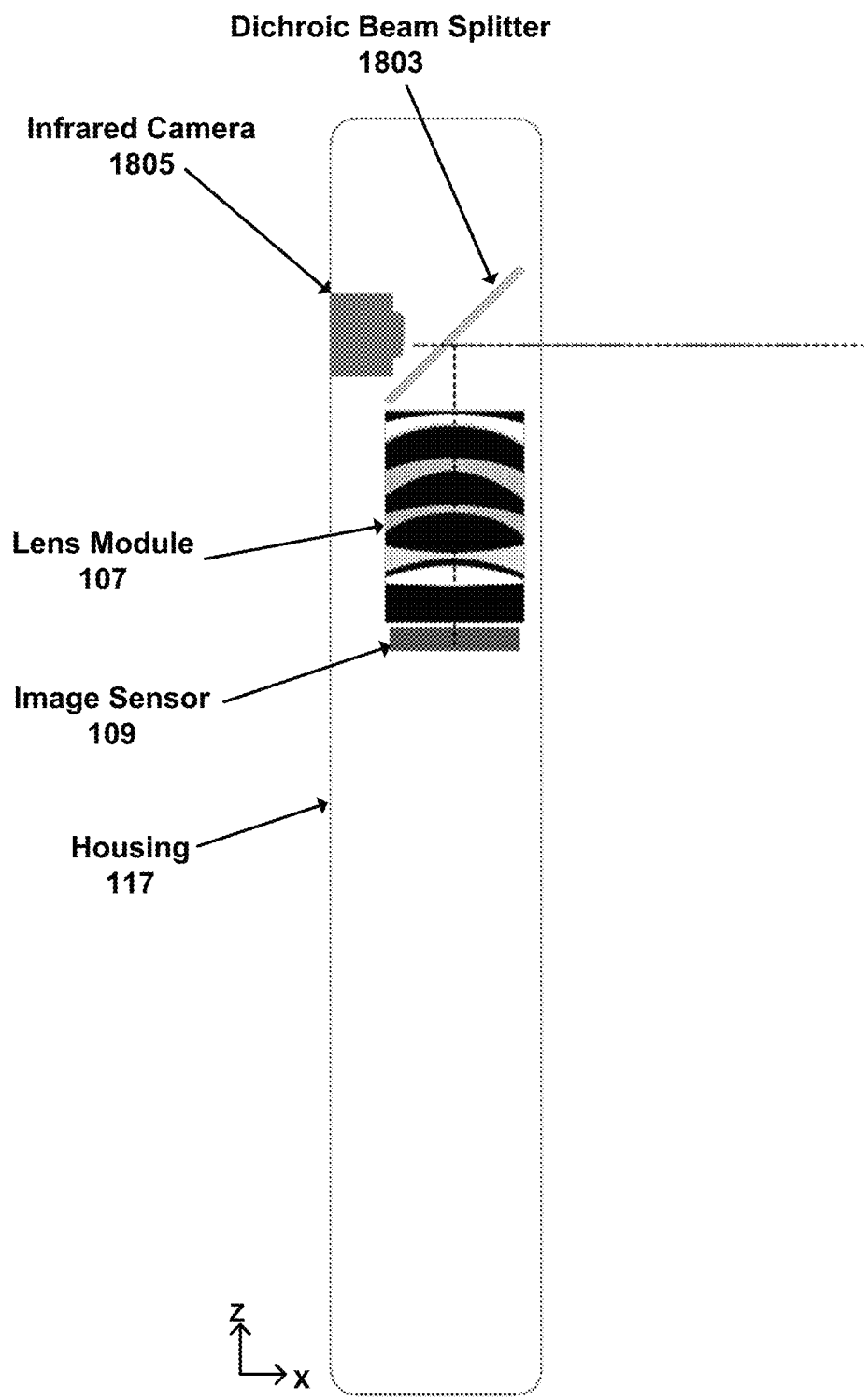
FIG. 18 illustrates a side view of an imaging system with a dichroic beam splitter, according to an embodiment.

Referring to FIG. 18, in some example embodiments, the reflector is a dichroic beam splitter 1803. A dichroic beam splitter has a splitting ratio that is dependent on the wavelength of the incident light. For example, the dichroic beam splitter 1803 directs light with visible wavelengths towards the sensor 109 and transmits light with infrared wavelengths to an infrared camera 1805 positioned behind the dichroic beam splitter 1803 (e.g., the dichroic beam splitter 1803 is between the window 102 (not illustrated in FIG. 18) and the infrared camera 1805). The advantage of such a setup is that a depth image determined by the infrared camera 1805 (e.g., using ToF or when coupled to an infrared pattern projector using structured light disparity calculations) may be co-aligned with the visible image captured by the image sensor 109. Thus, there may not be a need to warp one image to the other to align them (e.g., as done in depth imaging systems that have separate cameras). Having depth and visible (typically red, green, and blue) images aligned may be beneficial for image processing processes that use depth and color information such as synthetic depth of field, background replacement or removal, portrait mode, depth-based lighting effects, and more.

Example Uses of Depth Information

As described herein, depth information may be determined using an integrated split photodiode technology on the sensor 109 (described with reference to FIGS. 9-11), use of a stereo camera (e.g., using a lens array), or by using an integrated depth camera. In some embodiments, depth information may be used to manipulate blur introduced by the lens module 107 and its aperture to objects in the scene that are out of focus. Such blur may be nonsymmetrical due to the lens aperture shape. If symmetrical blur (e.g., circular blur) is desired, depth information may be used to apply blur in a direction or region of an image that has less or no blur. Thus, when the applied blur is combined with the nonsymmetrical blur, the image may have circular symmetrical blur.

In some embodiments, a high pass filter or edge detection algorithms (e.g., that are gradient based) are used to detect objects that are in focus or out of focus and which do not contain any high frequency energy.

In some embodiments, the aperture of the lens includes an apodization filter which has decreasing transmission closer to the peripheral of the aperture. The aperture may be not circular and the apodization profile may follow the aperture shape in a way that the transmission is defined by the distance from the outer contour of the aperture. The purpose of the apodization is to eliminate high frequency information from out of focus objects. This may allow for better image background/foreground separation for image processing processes that rely on background/foreground separation, such as portrait mode.

Example Method of Forming a Combined Image

Figure 12:
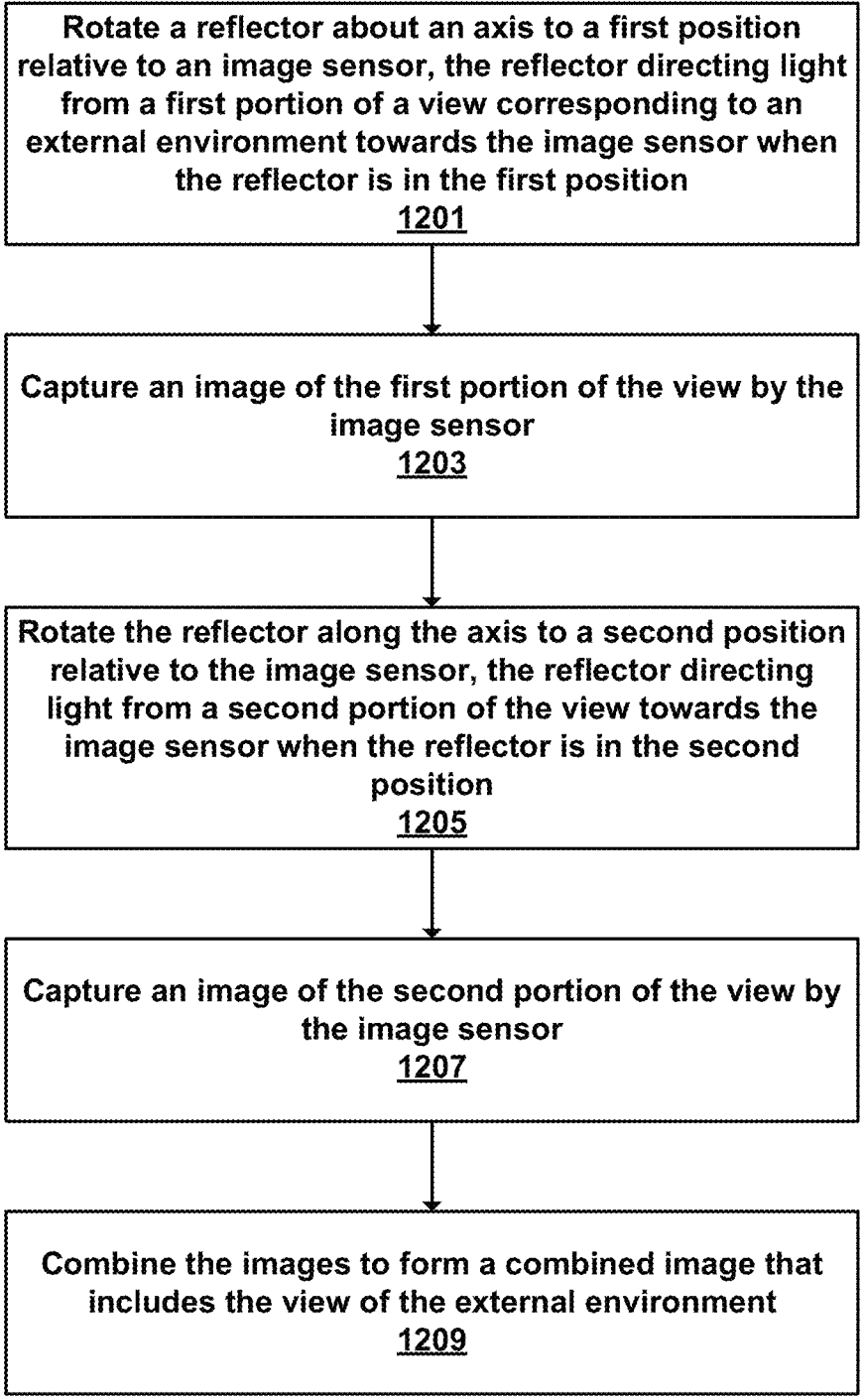
FIG. 12 is a flow chart illustrating a method for forming a combined image of a view of an external environment, according to an embodiment.

Referring now to FIG. 12, it is a flow chart illustrating a method for forming a combined image of a view of an external environment, according to an embodiment. The method may be performed from the perspective of controller 113. The steps of method may be performed in different orders, and the method may include different, additional, or fewer steps. One or more of the steps described may be stored as instructions on a machine-readable medium and executed by a processor (e.g., as describe with reference to FIG. 13).

The controller 113 rotates 1201 a reflector (e.g., reflector 105) about an axis (e.g., axis 115) to a first position relative to an image sensor (e.g., sensor 109). The reflector in the first position directs light from a first portion of a view corresponding to an external environment towards the image sensor. The image sensor captures 1203 an image of the first portion of the view. The controller 113 rotates 1205 the reflector along the axis to a second position relative to the image sensor. The reflector in the second position directs light from a second portion of the view corresponding to the external environment towards the image sensor. The second position may be different than the first position. The image sensor captures 1207 an image of the second portion of the view. The controller 113 combines 1209 the image of the first portion and the image of the second portion to form a combined image corresponding to the view of the external environment. The controller 113 may combine the images by performing image stitching.

The second portion of the view may have at least some overlap with the first portion of the view.

In some embodiments, the reflector is continually rotated during at least one of: the capturing of the image of the first portion by the image sensor, or the capturing of the image of the second portion of the view by the image sensor.

In some embodiments, the reflector is relatively stationary during at least one of: the capturing of the image of the first portion of the view by the image sensor, or the capturing of the image of the second portion of the view by the image sensor. In this context, relatively stationary may refer to the reflector rotating less than two degrees about the axis while the image sensor is capturing an image. For example, an intentional handshake effect at 50 milliseconds is up to 0.2 degrees. Thus, the reflector may rotate by 0.1 degrees in either direction during the exposure to compensate for the handshake.

To combine the images, the controller 113 may align features and edges in the image of the first portion with features and edges in the image of the second portion.

In some embodiments, the controller 113 captures an image of a second view corresponding to the external environment (image 1405 is an example image of a second view (view 1401) of an external environment). The second view includes at least some of the first and second portions (e.g., at least the stitching areas of the images of the first and second portions). The combining of the image of the first portion and the image of the second portion may be based on the image of the second view. The image of the second view may be captured by a second image sensor that is physically separate from the image sensor.

The controller 113 may receive motion data from a motion sensor, the motion data indicating motion of the image sensor relative to the view of the external environment. Responsive to determining the motion of the image sensor relative to the view of the external environment is above a threshold, the controller 113 may modify the first position of the reflector to compensate for the motion. The reflector at the modified first position directing light from the first portion of the view of the external environment towards the image sensor. Alternatively or additionally, the controller 113 may shift a position of the image sensor relative to the reflector, where the image sensor at the shifted position receives light from the first portion of the view of the external environment.

The reflector and the image sensor may be housed in a mobile device with a display and the light propagates though the display prior to being directed by the reflector.

In some embodiments, at the first position, an opposite side of the reflector directs light towards a second image sensor. The second image sensor is physically separate from the image sensor.

In some embodiments, the controller 113 rotates the reflector along the axis to a third position relative to the image sensor. At the third position, an opposite side of the reflector directs light from the first portion of the view towards the image sensor. The controller 113 captures a second image of the first portion of the view by the image sensor. The opposite side of the reflector may include a wavelength filter.

The controller 113 may rotate a second reflector about a second axis relative to the image sensor. The second reflector directs light from a third portion of a view of the external environment towards the image sensor. The controller 113 captures an image of the third portion of the view by the image sensor. In some embodiments, the reflector directs light towards a first portion of the image sensor and the second reflector directs light to a second portion of the image sensor.

In some embodiments, the first position directs the light from the first portion of the view towards a first portion of the image sensor. The controller 113 rotates the reflector about the axis to a third position relative to the image sensor. At the third position the reflector directs light from the first portion of the view towards a second portion of the image sensor. The second portion of the image sensor may include a wavelength filter that is not present on the first portion of the image sensor.

In some embodiments, the reflector is transparent to one or more infrared wavelengths. The controller captures an image of a portion of the of the view by an infrared camera, where the reflector is positioned between the infrared camera and window.

Example Machine Architecture

Figure 13:
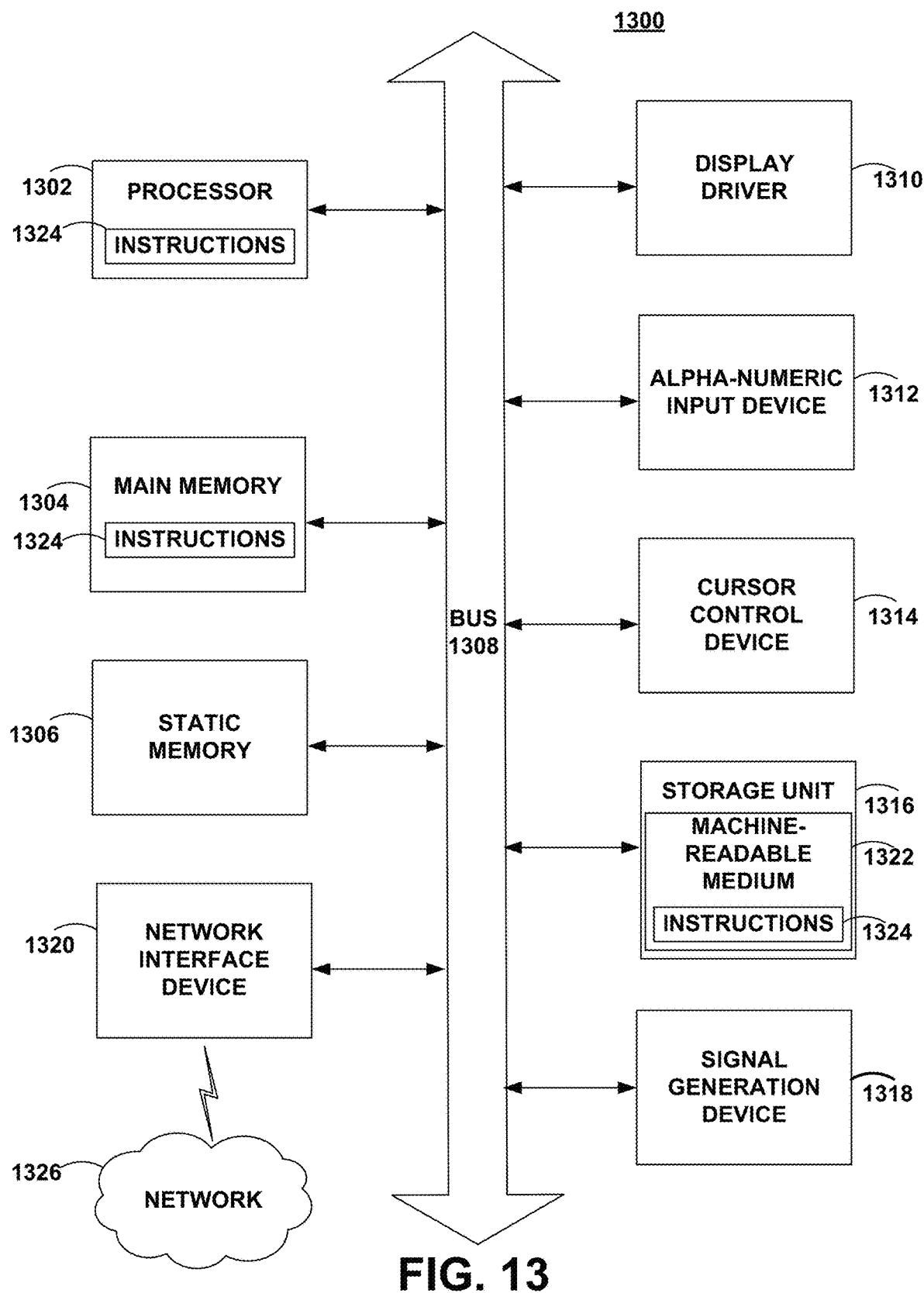
FIG. 13 is a block diagram illustrating components of an example machine able to read instructions from a machine-readable medium and execute them in a processor (or controller), according to an embodiment.

Referring now to FIG. 13, FIG. 13 is a block diagram illustrating components of an example machine able to read instructions from a machine-readable medium and execute them in a processor (or controller). Specifically, FIG. 13 shows a diagrammatic representation of the mobile device 103 in the example form of a computer system 1300. The computer system 1300 can be used to execute instructions 1324 (e.g., program code or software) for causing the machine to perform any one or more of the methodologies (or processes) described herein (e.g., the method describe with reference to FIG. 12). In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a standalone camera with processing components having a processor and a storage as described below. The machine also may be part of a system that includes a camera coupled with a server computer, a client computer, a personal computer (PC), a tablet PC, a set-top box (STB), a smartphone, an internet of things (IoT) appliance, or any machine capable of executing instructions 1324 (sequential or otherwise) that specify actions to be taken by that machine and that may be have a small volumetric area within which to incorporate an imaging system as described herein. Further, while only a single machine is illustrated, the term "machine" shall also be taken to include any collection of machines that individually or jointly execute instructions 1324 to perform any one or more of the methodologies discussed herein. The instructions may be, for example, instructions for controlling the imaging system components and/or image processing system described with respect to FIGS. 1-18.

The example computer system 1300 includes one or more processing units (generally processor 1302). The processor 1302 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1300 also includes a main memory 1304. The computer system may include a storage unit 1316. The processor 1302, memory 1304 and the storage unit 1316 communicate via a bus 1308.

In addition, the computer system 10106 can include a static memory 1306, a display driver 1310 (e.g., to drive a plasma display panel (PDP), a liquid crystal display (LCD), or a projector). The computer system 1300 may also include alphanumeric input device 1312 (e.g., a keyboard), a cursor control device 1314 (e.g., a mouse, a trackball, a joystick, a motion sensor, or other pointing instrument), a signal generation device 1318 (e.g., a speaker), and a network interface device 1320, which also are configured to communicate via the bus 1308.

The storage unit 1316 includes a machine-readable medium 1322 on which is stored instructions 1324 (e.g., software) embodying any one or more of the methodologies or functions described herein. The instructions 1324 may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 may be transmitted or received over a network 1326 via the network interface device 1320.

While machine-readable medium 1322 is shown in an example embodiment to be a single medium, the term "machine-readable medium" should be taken to include a single medium or multiple media (e.g., a centralized or distributed database, or associated caches and servers) able to store the instructions 1324. The term "machine-readable medium" shall also be taken to include any medium that is capable of storing instructions 1324 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The imaging system and associated algorithms described herein have several benefits over conventional cameras in terms of size, volume, shape, and performance. For example, among other advantages, the imaging system described herein may produce images with a larger resolution than conventional systems of comparable size. Furthermore, the imaging system can adjust the reflector during the capture of an image strip to compensate for unintentional motion of the system. Additionally, an image of the external environment in front of or behind the housing may be captured by rotating the reflector. If multiple image sensors are included in the housing, the imaging system may capture images in front of and behind the housing simultaneously. These are just a few of the advantages of the imaging system described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, the controller module 113. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1302, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for forming a combined image through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable storage medium comprising stored instructions, the instructions when executed cause at least one processor to:
   rotate a reflector about an axis to a first position relative to an image sensor, the reflector directing light from a first portion of a view corresponding to an external environment towards the image sensor when the reflector is in the first position;
   capture an image of the first portion of the view by the image sensor;
   rotate the reflector about the axis to a second position relative to the image sensor, the reflector directing light from a second portion of the view corresponding to the external environment towards the image sensor when the reflector is in the second position;
   capture an image of the second portion of the view by the image sensor;
   capture an image of a second view corresponding to the external environment, the second view including the first and second portions; and
   combine the image of the first portion and the image of the second portion based on the image of the second view to form a combined image corresponding to the view of the external environment.

2. The non-transitory computer-readable storage medium of claim 1, wherein the second portion of the view has at least some overlap with the first portion of the view.

3. The non-transitory computer-readable storage medium of claim 1, wherein the instruction to combine the image of the first portion and the image of the second portion to form a combined image comprise an instruction to stitch the image of the first portion and the image of the second portion.

4. The non-transitory computer-readable storage medium of claim 1, wherein at least one of: the instruction to capture the image of the first portion by the image sensor or the instruction to capture the image of the second portion of the view by the image sensor further comprises instructions that when executed by the processor causes the reflector to continually rotate.

5. The non-transitory computer-readable storage medium of claim 1, wherein at least one of: the instruction to capture the image of the first portion by the image sensor or the instruction to capture the image of the second portion of the view by the image sensor further comprises instructions that when executed by the processor causes the reflector to remain relatively stationary relative to the image sensor.

6. The non-transitory computer-readable storage medium of claim 1, wherein the image of the second view is captured by a second image sensor that is physically separate from the image sensor.

7. A non-transitory computer-readable storage medium comprising stored instructions, the instructions when executed cause at least one processor to:
   rotate a reflector about an axis to a first position relative to an image sensor, the reflector directing light from a first portion of a view corresponding to an external environment towards the image sensor when the reflector is in the first position;
   receive motion data from a motion sensor, the motion data indicating motion of the image sensor relative to the view of the external environment;
   responsive to determining the motion of the image sensor relative to the view of the external environment is above a threshold, modify the first position of the reflector to compensate for the motion, the reflector at the modified first position directing light from the first portion of the view of the external environment towards the image sensor;
   capture an image of the first portion of the view by the image sensor;
   rotate the reflector about the axis to a second position relative to the image sensor, the reflector directing light from a second portion of the view corresponding to the external environment towards the image sensor when the reflector is in the second position;
   capture an image of the second portion of the view by the image sensor; and
   combine the image of the first portion and the image of the second portion to form a combined image corresponding to the view of the external environment.

8. A non-transitory computer-readable storage medium comprising stored instructions, the instructions when executed cause at least one processor to:
   rotate a reflector about an axis to a first position relative to an image sensor, the reflector directing light from a first portion of a view corresponding to an external environment towards the image sensor when the reflector is in the first position;
   capture an image of the first portion of the view by the image sensor;
   rotate the reflector about the axis to a second position relative to the image sensor, the reflector directing light from a second portion of the view corresponding to the external environment towards the image sensor when the reflector is in the second position;
   capture an image of the second portion of the view by the image sensor;
   combine the image of the first portion and the image of the second portion to form a combined image corresponding to the view of the external environment;
   rotate the reflector about the axis to a third position relative to the image sensor, wherein an opposite side of the reflector directs light from the first portion of the view towards the image sensor when the reflector is in the third position; and
   capture a second image of the first portion of the view by the image sensor.

9. A non-transitory computer-readable storage medium comprising stored instructions, the instructions when executed cause at least one processor to:
   rotate a reflector about an axis to a first position relative to an image sensor, the reflector directing light from a first portion of a view corresponding to an external environment towards the image sensor when the reflector is in the first position;
   capture an image of the first portion of the view by the image sensor;
   rotate the reflector about the axis to a second position relative to the image sensor, the reflector directing light from a second portion of the view corresponding to the external environment towards the image sensor when the reflector is in the second position;
   capture an image of the second portion of the view by the image sensor;
   combine the image of the first portion and the image of the second portion to form a combined image corresponding to the view of the external environment;

rotate a second reflector about a second axis relative to the image sensor, the second reflector directing light from a third portion of view towards the image sensor; and capture an image of the third portion of the view by the image sensor.

10. A non-transitory computer-readable storage medium comprising stored instructions, the instructions when executed cause at least one processor to:

rotate a reflector about an axis to a first position relative to an image sensor, the reflector directing light from a first portion of a view corresponding to an external environment towards the image sensor when the reflector is in the first position, wherein the reflector at the first position directs light from the first portion of the view towards a first portion of the image sensor;

capture an image of the first portion of the view by the image sensor;

rotate the reflector about the axis to a second position relative to the image sensor, the reflector directing light from a second portion of the view corresponding to the external environment towards the image sensor when the reflector is in the second position;

capture an image of the second portion of the view by the image sensor;

combine the image of the first portion and the image of the second portion to form a combined image corresponding to the view of the external environment; and rotate the reflector about the axis to a third position relative to the image sensor, the reflector directing light from the first portion of the view towards a second portion of the image sensor.

11. A non-transitory computer-readable storage medium comprising stored instructions, the instructions when executed cause at least one processor to:

rotate a reflector about an axis to a first position relative to an image sensor, the reflector directing light from a first portion of a view corresponding to an external environment towards the image sensor when the reflector is in the first position;

capture an image of the first portion of the view by the image sensor;

rotate the reflector about the axis to a second position relative to the image sensor, the reflector directing light from a second portion of the view corresponding to the external environment towards the image sensor when the reflector is in the second position;

capture an image of the second portion of the view by the image sensor;

combine the image of the first portion and the image of the second portion to form a combined image corresponding to the view of the external environment; and capture an image of a portion of the of the view by an infrared camera, wherein the reflector is transparent to one or more infrared wavelengths and is positioned between the infrared camera and an aperture.

12. A method comprising:

rotating a reflector about an axis to a first position relative to an image sensor, the reflector directing light from a first portion of a view corresponding to an external environment towards the image sensor when the reflector is in the first position;

capturing an image of the first portion of the view by the image sensor;

rotating the reflector about the axis to a second position relative to the image sensor, the reflector directing light from a second portion of a view of the external environment towards the image sensor when the reflector is in the second position;

capturing an image of the second portion of the view by the image sensor;

capturing an image of a third portion of the view of the external environment, the third portion including the first and second portions; and combining the image of the first portion and the image of the second portion based on the image of the third portion of the view to form a combined image corresponding to the view of the external environment.

13. The method of claim 12, wherein the second portion of the view has at least some overlap with the first portion of the view.

14. The method of claim 12, wherein combining the image of the first portion and the image of the second portion to form a combined image comprises stitching the image of the first portion and the image of the second portion.

15. The method of claim 12, wherein the reflector is relatively stationary during at least one of: the capturing of the image of the first portion of the view by the image sensor, or the capturing of the image of the second portion of the view by the image sensor.

16. The method of claim 12, wherein the image of the third portion of the view is captured by a second image sensor that is physically separate from the image sensor.

17. A method comprising:

rotating a reflector about an axis to a first position relative to an image sensor, the reflector directing light from a first portion of a view corresponding to an external environment towards the image sensor when the reflector is in the first position;

receiving motion data from a motion sensor, the motion data indicating motion of the image sensor relative to the view of the external environment;

responsive to determining the motion of the image sensor relative to the view of the external environment is above a threshold, modifying the first position of the reflector to compensate for the motion, the reflector at the modified first position directing light from the first portion of the view of the external environment towards the image sensor;

capturing an image of the first portion of the view by the image sensor;

rotating the reflector about the axis to a second position relative to the image sensor, the reflector directing light from a second portion of a view of the external environment towards the image sensor when the reflector is in the second position;

capturing an image of the second portion of the view by the image sensor; and combining the image of the first portion and the image of the second portion to form a combined image corresponding to the view of the external environment.

18. A computer system comprising:

at least one processor; and a computer-readable storage medium comprising executable computer program code, the computer program code when executed cause the at least one processor to:

rotate a reflector about an axis to a first position relative to an image sensor, the reflector directing light from a first portion of a view corresponding to an external environment towards the image sensor when the reflector is in the first position;

capture an image of the first portion of the view by the image sensor;

rotate the reflector about the axis to a second position relative to the image sensor, the reflector directing light from a second portion of a view of the external environment towards the image sensor when the reflector is in the second position;

capture an image of the second portion of the view by the image sensor;

capture an image of a second view corresponding to the external environment, the second view including the first and second portions; and combine the image of the first portion and the image of the second portion based on the image of the second view to form a combined image corresponding to the view of the external environment.

19. The computer system of claim 18, wherein the second portion of the view has at least some overlap with the first portion of the view.

20. The computer system of claim 18, wherein the image of the second view is captured by a second image sensor that is physically separate from the image sensor.

\* \* \* \* \*

UNITED STATES PATENT AND TRADEMARK OFFICE
CERTIFICATE OF CORRECTION

PATENT NO. : 11,089,190 B2
APPLICATION NO. : 17/121315
DATED : August 10, 2021
INVENTOR(S) : Attar Page 1 of 1

It is certified that error appears in the above-identified patent and that said Letters Patent is hereby corrected as shown below:

In the Claims

In Column 27, in Claim 11, Line 54, delete "of the of the" and insert -- of the --, therefor.

Signed and Sealed this
First Day of March, 2022

Drew Hirshfeld
*Performing the Functions and Duties of the
Under Secretary of Commerce for Intellectual Property and
Director of the United States Patent and Trademark Office*